United States Patent
Wen et al.

(10) Patent No.: US 8,029,445 B2
(45) Date of Patent: Oct. 4, 2011

(54) METHOD AND APPARATUS FOR PROCESSING ULTRASOUND IMAGE SIGNALS

(75) Inventors: Xu Wen, Vancouver (CA); Septimiu E. Salcudean, Vancouver (CA); Peter D. Lawrence, Vancouver (CA); Reza Zahiri-Azar, Vancouver (CA)

(73) Assignee: The University of British Columbia, Vancouver (CA)

( * ) Notice: Subject to any disclaimer, the term of this patent is extended or adjusted under 35 U.S.C. 154(b) by 1040 days.

(21) Appl. No.: 11/705,084

(22) Filed: Feb. 12, 2007

(65) Prior Publication Data

US 2007/0230756 A1   Oct. 4, 2007

Related U.S. Application Data

(60) Provisional application No. 60/771,866, filed on Feb. 10, 2006.

(51) Int. Cl.
*A61B 8/00* (2006.01)
(52) U.S. Cl. ........................................ 600/443
(58) Field of Classification Search ............ 600/443
See application file for complete search history.

(56) References Cited

U.S. PATENT DOCUMENTS

| | | | |
|---|---|---|---|
| 4,858,124 A | 8/1989 | Lizzi et al. | |
| 6,200,266 B1 * | 3/2001 | Shokrollahi et al. | 600/438 |
| 6,238,342 B1 | 5/2001 | Feleppa et al. | |
| 6,245,016 B1 | 6/2001 | Daft et al. | |
| 6,422,997 B1 | 7/2002 | Green | |
| 6,549,802 B2 | 4/2003 | Thornton | |
| 2003/0065260 A1 | 4/2003 | Cheng et al. | |
| 2003/0097068 A1 * | 5/2003 | Hossack et al. | 600/443 |
| 2004/0039284 A1 | 2/2004 | Alam et al. | |
| 2004/0054281 A1 * | 3/2004 | Adam et al. | 600/437 |
| 2004/0248589 A1 * | 12/2004 | Gwon et al. | 455/456.1 |
| 2005/0288583 A1 | 12/2005 | Hirota | |

FOREIGN PATENT DOCUMENTS

WO   WO 0027289 A1   11/1999
WO   WO 2005092197 A1   3/2005

OTHER PUBLICATIONS

E.J. Feleppa, et al., "Novel methods of analyzing radio-frequency echo signals for the purpose of imaging brachytherapy seed is used to treat prostate cancer", Proc. of SPIE 4687, 127-138, 2002.

CC Blake, et al., "Variability and accuracy of measurements of prostate brachytherapy seed position in vitro using three-dimensional ultrasound: An intra- and inter-observer study", Medical Physics, Dec. 2000, vol. 27, Issue 12, pp. 2788-2795.

Patricia E. Lindsay, Jake Van Dyk, and Jerry J. Battista, "A systematic study of imaging uncertainties and their impact on 125I prostate brachytherapy dose evaluation", Medical Physics, Jul. 2003, vol. 30, Issue 7, pp. 1897-1908.

(Continued)

*Primary Examiner* — Brian Casler
*Assistant Examiner* — Jonathan G Cwern

(57) ABSTRACT

A method and apparatus for processing ultrasonic image signals is disclosed. The method involves receiving a plurality of input sample values representing reflected sound waves in a ultrasonic system, exponentiating each input sample to produce a plurality of respective exponentiated sample values, conditioning the exponentiated sample values to produce conditioned exponentiated sample values for receipt by an imageformer, and causing the imageformer to produce an image representing the ultrasonic sound waves in response to the conditioned exponentiated sample values.

18 Claims, 12 Drawing Sheets

OTHER PUBLICATIONS

Zhouping Wei, et al., "Robot-assisted 3D-TRUS guided prostate brachytherapy: System integration and validation", Medical Physics, Mar. 2004, vol. 31, Issue 3, pp. 539-548.

F.G. Mitri, P. Trompette, and J-Y Chapelon, "Improving the use of vibro-acoustography for brachytherpy metal seed imaging: A feasibility study", IEEE Transactions on Medical Imaging, Jan. 2004, vol. 23, Issue 1, pp. 1-6.

S.A. McAleavey, "Doppler technique for the detection and localization of modified brachytherapy seeds", Proceedings of SPIE, 2002, vol. 4687, pp. 190-198.

Fredereic L. Lizzi e al., "Theoretical Framework for spectrum analysis in ultrasonic tissue characterization", J. Acoust. Soc. Am. 73 4, 1983.

F.L. Lizzi, M. Ostromogilsky, E.J. Feleppa, M.S. Rorke, and M.M. Yaremko, "Relationship of ultrasonic spectral parameters to features of tissue microstructure", IEEE Trans. Ultrason., Ferroelec., Freq. Contr., 34:3, 19-329, 1987.

E.J. Feleppa, W.R. Fair, T. Liu, A. Kalisz, W. Gnadt, F.L. Lizzi, K.C. Balaji, C.R. Porter, and H. Tsai, "Two-dimensional and three-dimensional tissue-type imaging of the prostate based on ultrasonic spectrum analysis and neuralnetwork classification", Medical Instrumentation Engineers, K.K. Shung and M. Insana (Eds.), vol. 3982, pp. 152-160, Bellingham, WA, 2000.

E.J. Feleppa, T. Liu, F.L. Lizzi, A. Kalisz, R.H. Silverman, B. Sigel, and W.R. Fair, "Three-dimensional ultrasonic parametric and tissue-property imaging for tissue evaluation, treatment planning, therpy guidance, and efficacy assessment", Medical Instrumentation Engineers, K.K. Shung and M. Insana (Eds.), vol. 3982, pp. 68-76, Bellingham, WA, 2000.

E.J. Feleppa, et al., "Prostate imaging based on RF spectrum analysis and non-linear classifiers for guiding biopsies and targeting radiotherapy", Medical Imaging 2001: Imaging and Signal Processing, vol. 4325, pp. 371, 2000.

Abolmaesumi P, Sirouspour MR, "An interacting multiple model probabilistic data association filter for cavitiy boundary extraction from ultrasonic imgages", IEEE Transactions on Medical Imaging, 23(6): 772-784, 2004.

Shao F, Ling KV, Ng WS, Wu RY, "Prostate Boundary Detection From Ultrasonic Images", Medical Physics, 27(8): 1777-1788, 2000.

Shen D, Zhan Y and Davatzikos C.,"Segmentation of Prostate Boundaries From Ultrasound Images Using Statistical Shape Model", IEEE Transactions on Medical Imaging, 22(4): 539-551, 2003.

Alterovitz R, Pouliot J, Taschereau R, Hsu ICJ, Goldberg K, "Needle Insertion and Radioactive Seed Implantation in Human Tissues: Simulation and Sensitivity Analysis", Proceedings of the 2003 IEEE International Conference on Robotics and Automation (ICRA 2003), Sep. 2003.

Nag S, Bice W, DeWyngaert K, Prestidge B, Stock R, Yu Y., "The American Brachytherapy Society recommendations for permanent prostate brachytherapy postimplant dosimetric analysis", Int J Radiation Oncology Biol Phys, 46: 221-230, 2000.

Zelefsky MJ, Yamada Y, Marion C, Sim S, Cohen G, Ben-Porat L, Silvern D and Zaider M., "Improved conformality and decreased toxicity with intraoperative computer-optimized transperineal ultrasound-guided prostate brachytherapy", Int J Radiat Oncol Biol Phys. 55: 956-963, 2003.

American Cancer Society, "Cancer Facts and Figures 2006", American Cancer Society, Inc., Atlanta, GA, 2006.

A.L. Zietman, "Localized Prostate Cancer: Brachytherapy", Curr Treat Options Oncol 3, 429-436, 2002.

L. Potters, "Permanent prostate brachytherapy in men with clinically localized prostate cancer", Clin. Oncol. 15, 301-315, 2003.

S. Nag, J.P.Ciezki, R. Cormack, et al.,"Intraoperative planning and evaluation of permanent prostate brachytherapy: Report of the American Brachytherapy Society", Int. J. Radiat. Oncol. Biol. Ohys. 51, 1422-1430, 2001.

L. Beaulieu, D. Tubic, J. Pouliot et al., "Post-implant dosimetry using fusion of ultrasound images with 3D seed coordinates from fluoroscopic images in transperineal interstitial permanent prostate brachytherapy", Int. J. Radiat. Oncol. Biol. Phys. 48(3 suppl), 360, 2000.

D. French, J. Morris, M. Keyes, and S.E. Salcudean, "Real-time dosimetry for prostate brachytherapy using TRUS and fluoroscopy", Proc. MICCAI 3217, 983-991, 2004.

L. Gong, P.S. Cho, B.H. Han, et al., "Ultrasonography and fluoroscopic fusion for prostate brachytherapy dosimetry", Int. J. Radiat. Oncol. Biol. Phys. 54, 1322-1330, 2002.

A. Jain, T. Mustufa, Y. Zhou, et al., "Matching and reconstruction of brachytherapy seeds using the Hungarian algorithm (MARSHAL)", Proc. SPIE 5744, 810-821, 2005.

Y. Su, B.J. Davis, M.G. Herman, and R.A. Rob, "Fluoroscopy to ultrasound image registration using implanted sees as fiducials during permanent prostate brachytherapy", Proc. SPIE 5367, 371-378, 2004.

D.A. Todor, M. Zaider, G.N. Cohen, et al., "Intraoperative dynamic dosimetry for prostate implants", Phys. Med. Biol. 48, 1153-1171, 2003.

M. Zhang, M. Zaider, M. Worman, and G. Cohen, "On the question of 3D seed reconstruction in prostate brachytherapy: the determination of x-ray source and film locations", Phys. Med Biol. 49, 335-345, 2004.

Y.Yu, S.T. Acton, and K. Thornton, "Detection of radioactive seeds in ultrasound images of the prostate", Proc. IEEE Int. Conf, Image Process. 2, 319-322, 2001.

D.R. Holmes III and R.A. Robb, "Improved automated brachytherapy seed localization in trans-urethral ultrasound data", Proc. SPIE 5367, 353-360, 2004.

M. Ding, Z. Wei, D.B. Downey, and A. Fenster, "Automated seed localization for intra-operative prostate brachytherapy based on 3D line segment patterns", Proc. SPIE 5744, 417-424, 2005.

B.J. Davis, R.R. Kinnick, M. Fatemi, et al., "Measurement of the ultrasound backscatter signal from three seed types as a function of incidence angle: Application to permanent prostate brachytherapy", Int. J. Radiat. Oncol. Biol. Phys. 57, 1174-1182, 2003.

J. Xue, F. Waterman, J. Handler, and E. Gressen, "Localization of linked 125I seeds in postimplant TRUS images for prostate brachytherapy dosimetry", Int. J. Radiat. Oncol. Biol. Phys. 62, 912-919, 2005.

B.H. Han, K. Wallner, G. Merrick, et al., "Prostate brachytherapy seed identification on post-implant TRUS images", Med. Phys. 30, 898-900, 2003.

S.A. McAleavey, D.J. Rubens, and K.J. Parker, "Doppler ultrasound imaging of magnetically vibrated brachytherapy seeds", IEEE Trans. Biomend. Eng. 50, 252-255, 2003.

D. Kaplan and Q. Ma, "On the statistical characteristics of log-compressed Rayleight signals: Theoretical formulation and experimental results", J. Acoust. Soc. Am. 95(3), 1396-1400, 1994.

V. Dutt and J.F. Greenleaf, "Statistics of the log-compressed echo envelope", J. Acoust. Soc Am. 99(6), 3817-3825, 1996.

R.W. Prager, A.H. Gee, G.M. Treece, et al., "Decompression and speckle detection for ultrasound images using the homodyned k-distribution", Pattern Recognition Letters, 24, 705-713, 2003.

V. Lagerburg, M.A. Moerland, J.J.W. Lagendijk, and J.J. Battermann, "Measurement of prostate rotation during insertion of needles for brachytherapy", Radiother. Oncol. 77(3), 318-323, 2005.

A. Fenster, S. Tong, H.N. Cardinal, et al., "Three-dimensional ultrasound imaging system for prostate cancer diagnosis and treatment", IEEE Trans. Instrumentation Measurement 47, 1439-1447, 1998.

A. Tornes and M. Eriksen, "A New brachytherapy seed design for improved ultrasound visualization", Proc. IEEE Ultrasonic Symposium 2, 1278-1283, 2003.

American Cancer Society, "Cancer Facts and Figures 2005", www.cancer.org, 2005.

F.G. Mitri, P. Trompette, and J.Y. Chapelon, "Using vibro-acoustography to detect brachytherapy metal seeds", Ultrasonics Symposium, Proc. IEEE 2, 1528-1531, 2003.

T. Baldweck, P. Laugier, A. Herment, and G. Berger, "Application of autoregressive spectral analysis for ultrasound attenuation estimation: interest in highly attenuating medium", IEEE Transactions on Ultrasonics, Ferroelectrics, and Frequency Control 42, 99-110, 1995.

A. Fort, C. Manfredi, and S. Rocchi, "Recursive autroregressive spectral maps for ocular pathology detection", Ultrasound in Medicine and Biology 23, 391-403, 1997.

* cited by examiner

METHOD AND APPARATUS FOR PROCESSING ULTRASOUND IMAGE SIGNALS

This application claims benefit of the filing date of U.S. Provisional Patent Application 60/771,866 filed on Feb. 10, 2006, and which is incorporated herein by reference in its entirety.

STATEMENT AS TO RIGHTS TO INVENTIONS MADE UNDER FEDERALLY-SPONSORED RESEARCH AND DEVELOPMENT

This invention was made with Government support under grant R21 CA120232 awarded by the National Institutes of Health. The Government has certain rights in the invention.

BACKGROUND OF THE INVENTION

1. Field of Invention

This invention relates generally to ultrasound systems for inspecting a material and more particularly to processing ultrasound image signals.

2. Description of Related Art

Ultrasonic sound waves are commonly used when it is desired to perform a non-destructive or non-invasive inspection of a material, such as an organic body tissue, for example. Ultrasound systems are generally configured for either industrial or medical inspections. However the underlying principles of operation of such devices remain substantially the same and a major differentiator between medical and industrial systems is the type of material being inspected.

Ultrasound systems are generally useful in providing a display of internal structural characteristics of a material or objects located within the material. In some medical ultrasound inspections it is desired to view a relative position of objects within an organic body material. Such objects may be more highly reflecting than most body tissues.

For example, in prostate brachytherapy, an ultrasound system with a transrectal ultrasound (TRUS) transducer may be used to image a needle and/or small radioactive seeds, which are introduced into the prostate through a bore of the needle. The radioactive seeds are generally cylindrical, are typically less than 5 mm in length, and have a diameter of about 0.5 mm to about 1 mm, such that they can pass through typical needle bores. The radioactive seeds may include a medically-suitable radioisotope, for example I-125 or Pd-103. Conventional brightness mode (B-mode) ultrasonography is generally accepted to be unreliable for displaying objects within the prostate tissue.

Several methods and specialized apparatus have been employed for seed detection in brachytherapy using ultrasound.

PCT Patent application WO2005/092197A1 by Fenster et al. discloses an apparatus for automated seed segmentation from three-dimensional (3D) B-mode TRUS images. However, the use of 3D images is unlikely to increase the contrast between the implanted seeds and the surroundings, when using B-mode signals to produce the images.

U.S. Pat. No. 6,549,802 to Thornton et al. discloses a localization system that combines X-Ray fluoroscopy together with B-mode TRUS ultrasonography for identifying the radioactive seeds. However an image combination and registration requirement between the X-ray and ultrasound images is likely to increase examination time and cost.

U.S. Pat. No. 6,245,016B1 to Daft et al. discloses a post-beamformer signal processing algorithm for improving ultrasound B-mode resolution and contrast. The algorithm is based on a model of the imaging process that represents a shape of the pulse transmitted by the transducer and the frequency-dependent attenuation of that pulse as it propagates through tissue and back to the transducer, the effects of changes in frequency-dependent attenuation, and changes in scatterer density as the pulse propagates across tissue boundaries and through cystic and calcified structures.

US Patent Application 2004/0039284A1 by Alam et al. discloses several methods for enhancing the image of brachytherapy seeds by processing ultrasound radio frequency (RF) signals. A first disclosed approach employs Doppler ultrasound in which the radioactive seeds are vibrated within the tissue by vibration-inducing equipment. A second disclosed approach involves correlating image signatures with a reference signature of the radioactive seed, and a third approach discloses the use of elastography (strain imaging) wherein at least two sequential RF images under different levels of external compression are used.

There remains a need for better methods and apparatus for the ultrasound inspection of materials and particularly for inspection of organic tissues.

SUMMARY OF THE INVENTION

In accordance with one aspect of the invention there is provided a method for processing ultrasonic image signals. The method involves receiving a plurality of input sample values representing reflected sound waves in a ultrasonic system, exponentiating each input sample to produce a plurality of respective exponentiated sample values, conditioning the exponentiated sample values to produce conditioned exponentiated sample values for receipt by an imageformer, and causing the imageformer to produce an image representing the ultrasonic sound waves in response to the conditioned exponentiated sample values.

The exponentiating may involve raising each input sample value to a power greater than or equal to one.

The exponentiation may involve raising the input sample values to a power of about 2.

Receiving the input sample values may involve receiving a plurality of envelope sample values from an envelope interface, the envelope sample values representing an amplitude envelope of a radio frequency (RF) signal, the RF signal representing the reflected sound waves.

Receiving the plurality of input sample values may involve receiving a plurality of input sample values produced by compounding sample values representing reflected sound waves produced by incident ultrasonic sound waves having at least one of differing focal characteristics and differing beam steering angles.

Contiguous groups of a pre-defined number of input sample values may be associated with scan lines and the scan lines may define a scan frame representing a spatial ultrasound scan of a material, and the method may further involve receiving a plurality of scan frames representing successive ultrasound scans of the material produced by incident ultrasonic sound waves having at least one of differing focal characteristics and differing beam steering angles, and causing the imageformer to produce the image may further involve compounding conditioned exponentiated sample values in the plurality of scan frames before causing the imageformer to produce the image.

The conditioning may involve filtering the exponentiated sample values.

The filtering may involve median filtering the exponentiated sample values using a one dimensional median filter.

The reflected ultrasonic sound waves represent a location of an object within a material and the median filtering may involve median filtering the exponentiated sample values using a window having a number of samples selected in proportion to a size of the object.

Contiguous groups of a pre-defined number of input sample values may be associated with scan lines and the scan lines define a scan frame representing a spatial ultrasound scan of a material, and the conditioning may involve median filtering the exponentiated sample values in successive groups of at least three adjacent scan lines in the scan frame using a two-dimensional median filter.

The scan frames represent a location of an object within the material and the median filtering may involve median filtering the exponentiated sample values using a window having a number of samples selected in proportion to a size of the object.

The conditioning may involve setting exponentiated sample values that meet a criterion to a reference value.

The setting may involve at least one of setting exponentiated samples having a value less than a reference threshold value to a minimum sample value, and setting exponentiated sample values having a value greater than a maximum threshold value to the maximum threshold value.

The method may involve producing the plurality of input sample values before the exponentiation.

Producing the plurality of input sample values may involve receiving a plurality radio frequency (RF) sample values, the RF sample values representing the reflected sound waves, and grouping the RF sample values into groups of RF sample values, each group of RF sample values including a plurality of contiguous sample values associated with a respective time segment of the RF sample values, and finding a norm of each of the group of RF sample values to produce the plurality of input sample values.

The RF sample values may represent a location of an object within a material and the grouping may involve grouping the RF sample values into groups of RF sample values each having a number of samples selected in proportion to a size of the object.

Finding the norm may involve computing a norm for each group of RF sample values according to the relation:

$$z_i = \left[\sum_{j=1}^{n} |x_j|^p\right]^{\frac{1}{p}}$$

where:
$x_j$ are the RF sample values in said group of RF sample values;
$z_i$ is the input sample value computed for the $i^{th}$ group of RF sample values; and
p is a power greater than or equal to one.

The method may involve applying a window function to the RF sample values in each group of RF sample values.

Finding the norm may involve for each group of RF sample values, computing a discrete Fourier transform for each group of RF sample values to produce a plurality of frequency component values associated with each the group of RF sample values, and computing a norm of said plurality of frequency component values associated with each said group of RF samples.

Computing the norm may involve computing a norm according to the relation:

$$z_i = \left[\sum_{k=1}^{N} |X_k|^p\right]^{\frac{1}{p}}$$

where:
$X_k$ are the frequency component values of the Fourier spectrum for the group of RF sample values;
$z_i$ is the input sample value computed for the $i^{th}$ group of RF sample values;
N is the number frequency component values in the Fourier spectrum for the group of RF sample values; and
p is a power greater than or equal to one.

Computing the discrete Fourier transform may involve computing a fast Fourier transform (FFT) for each group of RF sample values.

The method may involve appending zero value samples to each group of RF sample values to cause each the group of RF sample values to include a number of RF sample values required for computation of the fast Fourier transform.

The method may involve setting at least some of the frequency component values to a zero value before the computing the norm.

Producing the plurality of input sample values may involve receiving a plurality of compressed envelope sample values, the compressed envelope sample values representing a compressed amplitude envelope of a radio frequency (RF) signal, the RF signal representing the reflected sound waves, and decompressing the compressed envelope sample values to produce the input sample values.

Receiving the plurality of compressed envelope sample values may involve receiving logarithmically compressed sample values.

The decompressing may involve computing the input sample values according to the relation:

$$x_i = K e^{\left(\frac{y_i}{D}\right)},$$

where:
$x_i$ represents values of said input sample values;
$y_i$ represents said compressed envelope sample values;
D represents a dynamic range parameter;
e is the base of the natural logarithm; and
K is a constant.

The imageformer may be a first imageformer and producing the plurality of input sample values may involve receiving a plurality of brightness-mode (B-mode) sample values, the B-mode sample values being generated by a second imageformer associated with the ultrasound system.

The method may involve decompressing the B-mode sample values to produce the input sample values.

Receiving the plurality of B-mode sample values may involve receiving logarithmically compressed B-mode sample values.

The decompressing may involve computing the input sample values according to the relation:

$$x_i = K e^{\left(\frac{y_i}{D}\right)},$$

where:
$x_i$ represents said input sample values;
$y_i$ represents said B-mode sample values;
D represents a dynamic range parameter;
e is the base of the natural logarithm; and
K is a constant.

In accordance with another aspect of the invention there is provided a method for processing ultrasonic image signals. The method involves receiving a plurality of input sample values representing reflected sound waves in a ultrasonic system, exponentiating each sample to produce a plurality of respective exponentiated sample values, conditioning the exponentiated sample values to produce conditioned exponentiated sample values for receipt by an imageformer, and making the conditioned exponentiated sample values available to the imageformer to produce an image representing the ultrasonic reflections.

In accordance with another aspect of the invention there is provided an apparatus for processing ultrasonic image signals. The apparatus includes provisions for receiving a plurality of input sample values representing reflected sound waves in a ultrasonic system, provisions for exponentiating each input sample to produce a plurality of respective exponentiated sample values, provisions for conditioning the exponentiated sample values to produce conditioned exponentiated sample values for receipt by an imageformer, and provisions for causing the imageformer to produce an image representing the ultrasonic sound waves in response to the conditioned exponentiated sample values.

The provisions for exponentiating may include provisions for raising each input sample value to a power greater than or equal to one.

The provisions for exponentiation may include provisions for raising the input sample values to a power of about 2.

The provisions for receiving the input sample values may include provisions for receiving a plurality of envelope sample values from an envelope interface, the envelope sample values representing an amplitude envelope of a radio frequency (RF) signal, the RF signal representing the reflected sound waves.

The provisions for receiving the plurality of input sample values may include provisions for receiving a plurality of input sample values produced by compounding sample values representing reflected sound waves produced by incident ultrasonic sound waves having at least one of differing focal characteristics and differing beam steering angles.

Contiguous groups of a pre-defined number of input sample values may be associated with scan lines and the scan lines define a scan frame representing a spatial ultrasound scan of a material, and may further include provisions for receiving a plurality of scan frames representing successive ultrasound scans of the material produced by incident ultrasonic sound waves having at least one of differing focal characteristics and differing beam steering angles, and the provisions for causing the imageformer to produce the image may further include provisions for compounding conditioned exponentiated sample values in the plurality of scan frames before causing the imageformer to produce the image.

The provisions for conditioning may include provisions for filtering the exponentiated sample values.

The provisions for filtering may include provisions for median filtering the exponentiated sample values using a one dimensional median filter.

The reflected ultrasonic sound waves may represent a location of an object within a material and the provisions for median filtering may include provisions for median filtering the exponentiated sample values using a window having a number of samples selected in proportion to a size of the object.

Contiguous groups of a pre-defined number of input sample values may be associated with scan lines and the scan lines may define a scan frame representing a spatial ultrasound scan of a material, and the provisions for conditioning may include provisions for median filtering the exponentiated sample values in successive groups of at least three adjacent scan lines in the scan frame using a two-dimensional median filter.

The scan frames may represent a location of an object within the material and the provisions for median filtering may include provisions for median filtering the exponentiated sample values using a window having a number of samples selected in proportion to a size of the object.

The provisions for conditioning may include provisions for setting exponentiated sample values that meet a criterion to a reference value.

The provisions for setting may include at least one of provisions for setting exponentiated samples having a value less than a reference threshold value to a minimum sample value, and provisions for setting exponentiated sample values having a value greater than a maximum threshold value to the maximum threshold value.

The apparatus may include provisions for producing the plurality of input sample values before the exponentiation.

The provisions for producing the plurality of input sample values may include provisions for receiving a plurality radio frequency (RF) sample values, the RF sample values representing the reflected sound waves, provisions for grouping the RF sample values into groups of RF sample values, each group of RF sample values including a plurality of contiguous sample values associated with a respective time segment of the RF sample values, and provisions for finding a norm of each of the group of RF sample values to produce the plurality of input sample values.

The RF sample values may represent a location of an object within a material and the provisions for grouping may include provisions for grouping the RF sample values into groups of RF sample values each having a number of samples selected in proportion to a size of the object.

The provisions for finding the norm may include provisions for computing a norm for each group of RF sample values according to the relation:

$$z_i = \left[\sum_{j=1}^{n} |x_j|^p\right]^{\frac{1}{p}}$$

where:
  $x_j$ are the RF sample values in said group of RF sample values;
  $z_i$ is the input sample value computed for the $i^{th}$ group of RF sample values; and
  p is a power greater than or equal to one.

The apparatus may include provisions for applying a window function to the RF sample values in each group of RF sample values.

The provisions for finding the norm may include for each group of RF sample values provisions for computing a discrete Fourier transform for each group of RF sample values to produce a plurality of frequency component values associated with each the group of RF sample values, and provisions for computing a norm of the plurality of frequency component values associated with each group of RF samples.

The provisions for computing the norm may include provisions for computing a norm according to the relation:

$$z_i = \left[\sum_{k=1}^{N} |X_k|^p\right]^{\frac{1}{p}}$$

where:
  $X_k$ are the frequency component values of the Fourier spectrum for the group of RF sample values;

$z_i$ is the input sample value computed for the $i^{th}$ group of RF sample values;

N is the number frequency component values in the Fourier spectrum for the group of RF sample values; and p is a power greater than or equal to one.

Computing the discrete Fourier transform may include provisions for computing a fast Fourier transform (FFT) for each group of RF sample values.

The apparatus may include provisions for appending zero value samples to each group of RF sample values to cause each the group of RF sample values to include a number of RF sample values required for computation of the fast Fourier transform.

The apparatus may include provisions for setting at least some of the frequency component values to a zero value before computing the norm.

The provisions for producing the plurality of input sample values may include provisions for receiving a plurality of compressed envelope sample values, the compressed envelope sample values representing a compressed amplitude envelope of a radio frequency (RF) signal, the RF signal representing the reflected sound waves, and provisions for decompressing the compressed envelope sample values to produce the input sample values.

The provisions for receiving the plurality of compressed envelope sample values may include provisions for receiving logarithmically compressed sample values.

The provisions for decompressing may include provisions for computing the input sample values according to the relation:

$$x_i = Ke^{\left(\frac{y_i}{D}\right)},$$

where:

$x_i$ represents values of said input sample values;
$y_i$ represents said compressed envelope sample values;
D represents a dynamic range parameter;
e is the base of the natural logarithm; and
K is a constant.

The imageformer may be a first imageformer and the provisions for producing the plurality of input sample values may include provisions for receiving a plurality of brightness-mode (B-mode) sample values, the B-mode sample values being generated by a second imageformer associated with the ultrasound system.

The apparatus may include provisions for decompressing the B-mode sample values to produce the input sample values.

The provisions for receiving the plurality of B-mode sample values may include provisions for receiving logarithmically compressed B-mode sample values.

The provisions for decompressing may include provisions for computing the input sample values according to the relation:

$$x_i = Ke^{\left(\frac{y_i}{D}\right)},$$

where:

$x_i$ represents values of said input sample values;
$y_i$ represents said compressed envelope sample values;
D represents a dynamic range parameter;
e is the base of the natural logarithm; and
K is a constant.

In accordance with another aspect of the invention there is provided an apparatus for processing ultrasonic image signals. The apparatus includes provisions for receiving a plurality of input sample values representing reflected sound waves in a ultrasonic system, provisions for exponentiating each sample to produce a plurality of respective exponentiated sample values, provisions for conditioning the exponentiated sample values to produce conditioned exponentiated sample values for receipt by an imageformer, and provisions for making the conditioned exponentiated sample values available to the imageformer to produce an image representing the ultrasonic reflections.

In accordance with another aspect of the invention there is provided an apparatus for processing ultrasonic image signals. The apparatus includes a receiver for receiving a plurality of input sample values representing reflected sound waves in a ultrasonic system. The apparatus also includes an image enhancer operably configured to exponentiate each input sample to produce a plurality of respective exponentiated sample values, condition the exponentiated sample values to produce conditioned exponentiated sample values for receipt by an imageformer. The apparatus further includes an imageformer operably configured to produce an image representing the ultrasonic sound waves in response to the conditioned exponentiated sample values.

The image enhancer may be operably configured to raise each input sample value to a power greater than or equal to one.

Image enhancer may be operably configured to raise the input sample values to a power of about 2.

The apparatus may include an envelope interface operably configured to produce envelope sample values for receipt by the receiver, the envelope sample values representing an amplitude envelope of a radio frequency (RF) signal, the RF signal representing the reflected sound waves.

The receiver may be operably configured to receive a plurality of input sample values produced by compounding sample values representing reflected sound waves produced by incident ultrasonic sound waves having at least one of differing focal characteristics and differing beam steering angles.

Contiguous groups of a pre-defined number of input sample values may be associated with scan lines and the scan lines define a scan frame representing a spatial ultrasound scan of a material, and the receiver may be operably configured to receive a plurality of scan frames representing successive ultrasound scans of the material produced by incident ultrasonic sound waves having at least one of differing focal characteristics and differing beam steering angles and the imageformer may be operably configured to compound conditioned exponentiated sample values in the plurality of scan frames before causing the imageformer to produce the image.

The conditioner may include a filter operably configured to filter the exponentiated sample values.

The filter may include a one dimensional median filter.

The reflected ultrasonic sound waves represent a location of an object within a material and the median filter may include a window having a number of samples selected in proportion to a size of the object.

Contiguous groups of a pre-defined number of input sample values may be associated with scan lines and the scan lines define a scan frame representing a spatial ultrasound scan of a material, and the conditioner may include a two-dimensional median filter operably configured to filter the exponentiated sample values in successive groups of at least three adjacent scan lines in the scan frame.

The scan frames represent a location of an object within the material and the median filter may include a window having a number of samples selected in proportion to a size of the object.

The conditioner may be operably configured to set exponentiated sample values that meet a criterion to a reference value.

The conditioner may be operably configured to set at least one of exponentiated samples having a value less than a reference threshold value to a minimum sample value, and exponentiated sample values having a value greater than a maximum threshold value to the maximum threshold value.

The apparatus may include an interface operably configured to produce the plurality of input sample values before the exponentiation.

The interface may include a radio frequency (RF) interface, the RF interface being operably configured to receive a plurality of RF sample values, the RF sample values representing the reflected sound waves, group the RF sample values into groups of RF sample values, each group of RF sample values may include a plurality of contiguous sample values associated with a respective time segment of the RF sample values, and find a norm of each of the group of RF sample values to produce the plurality of input sample values.

The RF sample values represent a location of an object within a material and the RF interface may be operably configured to group the RF sample values into groups of RF sample values each having a number of samples selected in proportion to a size of the object.

The RF interface may be operably configured to compute a norm for each group of RF sample values according to the relation:

$$z_i = \left[\sum_{j=1}^{n} |x_j|^p\right]^{\frac{1}{p}}$$

where:
  $x_j$ are the RF sample values in said group of RF sample values;
  $z_i$ is the input sample value computed for the $i^{th}$ group of RF sample values; and
  p is a power greater than or equal to one.

The RF interface may be operably configured to apply a window function to the RF sample values in each group of RF sample values.

The RF interface may be operably configured to compute a discrete Fourier transform for each group of RF sample values to produce a plurality of frequency component values associated with each the group of RF sample values, and compute a norm of the plurality of frequency component values associated with each group of RF samples.

The RF interface may be operably configured to compute the norm according to the relation:

$$z_i = \left[\sum_{k=1}^{N} |X_k|^p\right]^{\frac{1}{p}}$$

where:
  $X_k$ are the frequency component values of the Fourier spectrum for the group of RF sample values;
  $z_i$ is the input sample value computed for the $i^{th}$ group of RF sample values;
  N is the number frequency component values in the Fourier spectrum for the group of RF sample values; and
  p is a power greater than or equal to one.

The RF interface may be operably configured to compute a fast Fourier transform (FFT) for each group of RF sample values.

The RF interface may be operably configured to append zero value samples to each group of RF sample values to cause each the group of RF sample values to include a number RF sample values required for computation of the fast Fourier transform.

The RF interface may be operably configured to set at least some of the frequency component values to a zero value before computing the norm.

The interface may include a compression interface operably configured to receive a plurality of compressed envelope sample values, the compressed envelope sample values representing a compressed amplitude envelope of a radio frequency (RF) signal, the RF signal representing the reflected sound waves, and decompress the compressed envelope sample values to produce the input sample values.

The compression interface may be operably configured to receive logarithmically compressed sample values.

The compression interface may be operably configured to compute the input sample values according to the relation:

$$x_i = K e^{\left(\frac{y_i}{D}\right)},$$

where:
  $x_i$ represents values of said input sample values;
  $y_i$ represents said compressed envelope sample values;
  D represents a dynamic range parameter;
  e is the base of the natural logarithm; and
  K is a constant.

The imageformer may be a first imageformer and the interface may include a brightness-mode (B-mode) interface, the B-mode interface being operably configured to receive a plurality of B-mode sample values from the ultrasonic system, the B-mode sample values being generated by a second imageformer associated with the ultrasound system.

The B-mode interface may be operably configured to decompress the B-mode sample values to produce the input sample values.

The B-mode interface may be operably configured to receive logarithmically compressed B-mode sample values.

The B-mode interface may be operably configured to compute the input sample values according to the relation:

$$x_i = K e^{\left(\frac{y_i}{D}\right)},$$

where:
  $x_i$ represents values of said input sample values;
  $y_i$ represents said compressed envelope sample values;
  D represents a dynamic range parameter;
  e is the base of the natural logarithm; and
  K is a constant.

In accordance with another aspect of the invention there is provided an apparatus for processing ultrasonic image signals. The apparatus includes a receiver operably configured to receive a plurality of input sample values representing reflected sound waves in a ultrasonic system. The apparatus also includes an image enhancer operably configured to exponentiate each sample to produce a plurality of respective exponentiated sample values, condition the exponentiated sample values to produce conditioned exponentiated sample values for receipt by an imageformer, and make the conditioned exponentiated sample values available to an imageformer to produce an image representing the ultrasonic reflections.

In accordance with another aspect of the invention there is provided a computer readable medium encoded with codes for directing a processor circuit to carry out a method for processing ultrasonic image signals. The method involves receiving a plurality of input sample values representing reflected sound waves in a ultrasonic system, exponentiating each input sample to produce a plurality of respective exponentiated sample values, conditioning the exponentiated sample values to produce conditioned exponentiated sample values for receipt by an imageformer, and causing the imageformer to produce an image representing the ultrasonic sound waves in response to the conditioned exponentiated sample values.

In accordance with another aspect of the invention there is provided a computer readable signal encoded with codes for directing a processor circuit to carry out a method for processing ultrasonic image signals. The method involves receiving a plurality of input sample values representing reflected sound waves in a ultrasonic system, exponentiating each input sample to produce a plurality of respective exponentiated sample values, conditioning the exponentiated sample values to produce conditioned exponentiated sample values for receipt by an imageformer, and causing the imageformer to produce an image representing the ultrasonic sound waves in response to the conditioned exponentiated sample values.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Ultrasound System

Figure 1:
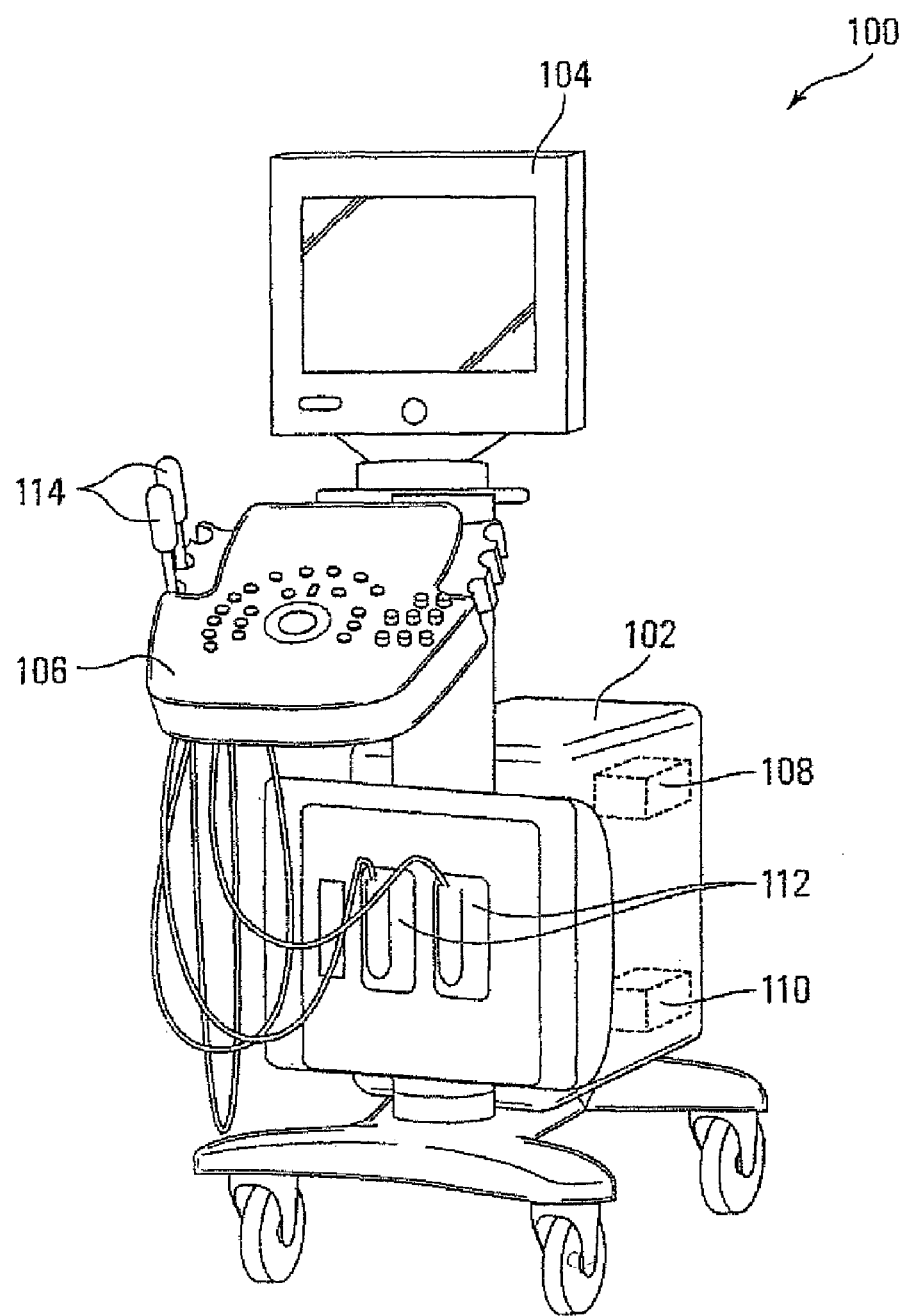
FIG. 1 is a perspective view of an ultrasound system.

Referring to FIG. 1, an ultrasound system is shown generally at 100. The ultrasound system 100 includes a computer 102, a display 104, and a console 106 for controlling operation of the system. The display 104 is in communication with the computer 102 for displaying images representing results of an ultrasound inspection of a material.

The computer 102 includes a processor circuit 108, a signal acquisition module 110, and an interface 112 for connecting an ultrasound transducer 114 to the signal acquisition module. In general, the signal acquisition module 110 receives signals from the transducer 114 and provides digital signal values representing the signals to the processor circuit 108. In one embodiment the transducer 114 may include a transrectal ultrasound (TRUS) transducer, which may be used for forming images of a human prostate gland for diagnosis, for example.

Ultrasound systems, such as the ultrasound system 100, are available from several manufacturers. For example the Ultrasonix RP-500 ultrasound system and BPSL9-5 broadband endo-rectal transducer are available from Ultrasonix Medical Corporation, of Burnaby, BC, Canada.

In general, the transducer 114 transmits ultrasonic sound waves into the material. The ultrasonic sound waves propagate through the material and ultrasonic sound wave energy is reflected back from locations in the material where there is a change or a discontinuity in acoustic impedance. For example, metal objects in a material such as a body tissue cause a large discontinuity in acoustic impedance at an interface between the material and the object, resulting in relatively large reflected energy from such interfaces. In contrast other smaller discontinuities in the tissue, due to small differences in tissue type for example, cause only weak reflections. Such objects may include, but are not limited to, needles and other highly reflective instruments and metallic or other highly reflective particles implanted in the body for imaging, diagnosis or treatment of disease, such as brachytherapy seeds. Highly reflective objects are typically made of or coated with metallic elements such as copper or aluminum, steel, or other materials that reflect ultrasound waves strongly compared to their surroundings. In particular, the metal brachytherapy seed is a very strong reflector and much more wave energy is reflected from the seed than from other scatterers in tissue. The reflected ultrasonic sound wave energy is generally scattered back in a plurality of directions and some of the reflected energy is received at the transducer 114, where it is converted into representative radio frequency (RF) analog signals by the signal acquisition module 110.

The signal acquisition module 110 then performs analog-to-digital conversion on the RF analog signals to produce a plurality of RF sample values at discrete time intervals in accordance with a sampling rate of the analog-to-digital sampling process. The RF sample values thus represent the reflected ultrasonic sound waves received by the transducer 114.

Commonly, the ultrasound system 100 performs sequential scans representing a spatial ultrasound scan over a field of the material, thereby producing a plurality of scan lines which are grouped into a scan frame representing the scan of the field.

Figure 2:
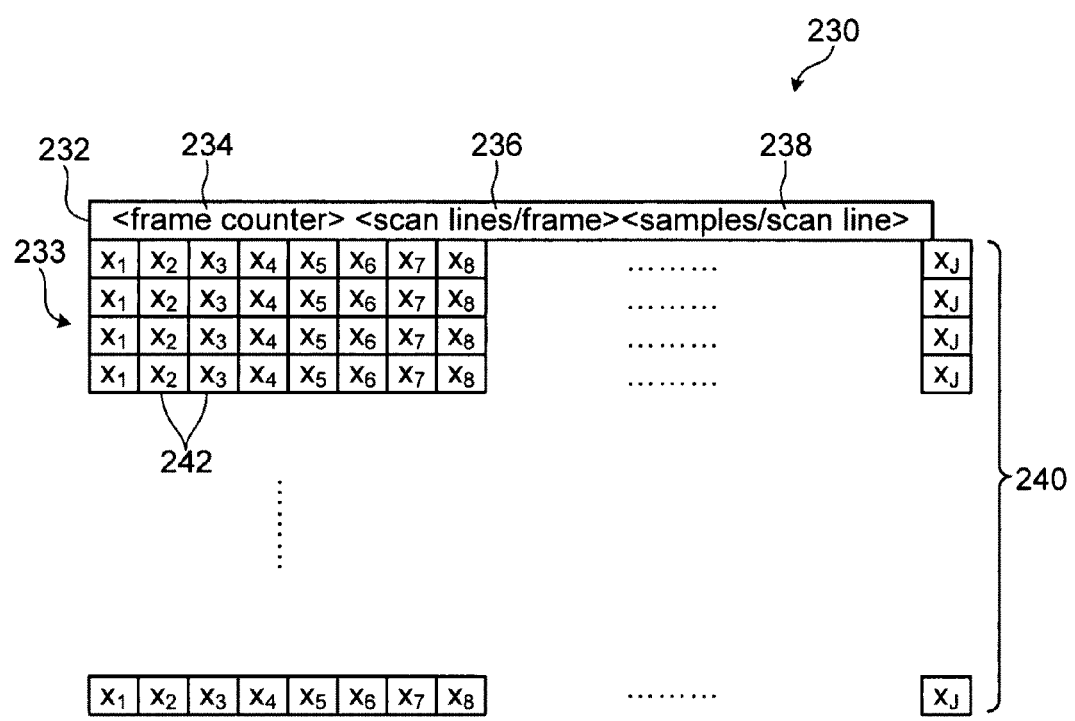
FIG. 2 is a schematic view of a signal frame produced by the ultrasound system shown in FIG. 1.

Referring to FIG. 2, an exemplary scan frame is shown generally at 230. The scan frame 230 includes a frame header 232 and a payload 233. In this embodiment the frame header includes a frame counter field 234 for holding a frame count, a scan lines/frame field 236 for holding a number of scan lines in the scan frame 230, and a samples/scan line field 238 for holding a number of samples in each scan line. The payload 233 further includes a plurality of sample values 242. Each sample value 242 represents an amplitude of the reflected, ultrasonic sound wave at a point in the scan field, as sampled at discrete time intervals by the signal acquisition module 110. The values in the scan lines/frame field 236 and the samples/scan line field 238 may be used to divide the scan frame 230 into a plurality of scan lines 240, as shown in FIG. 2. In the ultrasound system 100 shown in FIG. 1; scan frames 230 are generally transmitted and stored as a serial sequence, including the frame header 232 followed by a plurality of sample values 242.

Each scan frame 230 represents a spatial scan of the material and may be transmitted and processed as a "unit of data" in the ultrasound system 100.

In some embodiments a plurality of successive scan frames 230 may be produced by the ultrasound system 100. In one embodiment, each new scan frame 230 may be preceded by a frame interrupt produced by the ultrasound system 100 to indicate acquisition of a new scan frame 230. The plurality of successive scan frames 230 may represent successive identical scans of the material and may be averaged into a single scan frame 230 by adding or averaging corresponding sample values across the plurality of scan frames.

Alternatively the plurality of successive scan frames 230 may be produced in response to a plurality of scans having transmitted ultrasonic beams having differing focal characteristics. For example different focal depths within the material may be used to reduce effects of incident beam shape on the reflected ultrasonic sound waves. A plurality of successive scan frames 230 at different focal depths may be averaged into a single scan frame 230 by adding or averaging corresponding sample values across the plurality of scan frames.

Alternatively the plurality of successive scan frames 230 may be produced in response to a plurality of scans performed using different beam steering angles. For example, when the material includes a plurality of objects, some objects may be obscured by objects that are closer to the transducer 114, and by directing incident ultrasonic sound waves at a plurality of angles into the material, such obscured objects may be correctly displayed in a resulting image. Furthermore in some instances when ultrasonic sound waves are incident on an object, the geometry of the object may result in a significant portion of the ultrasonic energy being reflected away from the transducer. Accordingly, directing incident ultrasonic sound waves at a plurality of angles toward the object may cause otherwise poorly reflecting objects to reflect a more significant portion of ultrasonic sound energy back to the transducer.

For example, a plurality of incident ultrasonic sound waves may be directed toward the object at angles ranging from between −20 to 20 degrees at angular spacing intervals of 5 degrees. The scan frames produced by the signal acquisition unit 110 may then be compounded together to produce a representative image. Compounding of scan frames is known in the art and is described in several references including "D. Christensen; Ultrasonic Bioinstrumentation, John Wiley & Sons, Inc., New York, 1988", "M. Berson et al. Compound scanning with an electrically steered beam; Ultrasonic Imaging, 3: 303-308, 1981" and "S. Jespersen et al. Multi-angle compound imaging. Ultrasonic Imaging, 20: 81-102, 1998".

Processor Circuit

Figure 3:
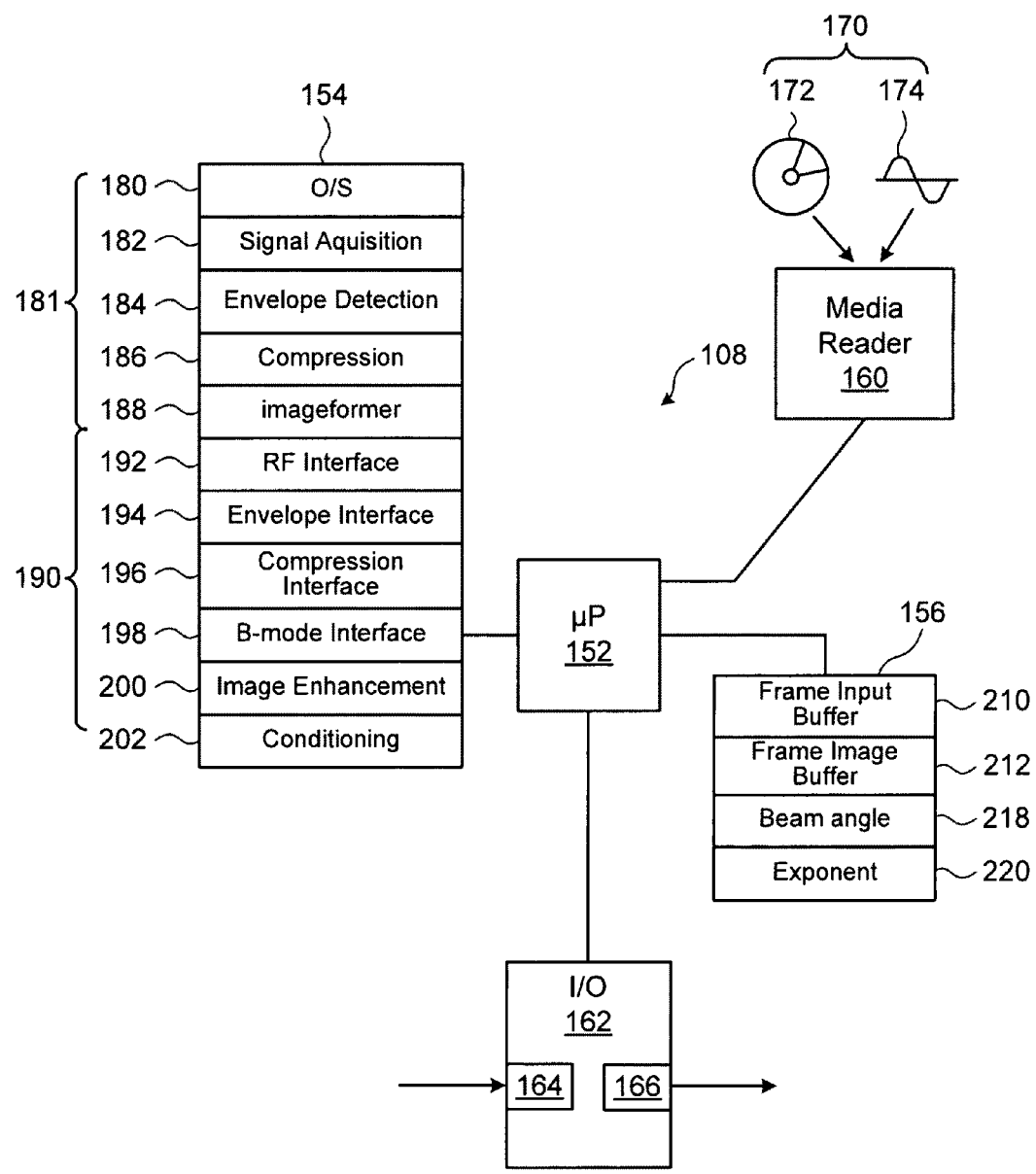
FIG. 3 is a schematic view of a processor circuit used in the ultrasound system shown in FIG. 1.

The processor circuit 108 is shown in greater detail in FIG. 3. Referring to FIG. 3, the processor circuit 108 includes a microprocessor 152, a program memory 154, a variable memory 156, a media reader 160, and an input output port (I/O) 162, all of which are in communication with the microprocessor 152.

The I/O 162 includes a receiver 164 for receiving input signal values from the signal acquisition module 110. The signals received from the signal acquisition module 110 generally represent ultrasound sound waves reflected from a material (not shown) and/or objects within the material.

The I/O 162 also includes an interface 166 producing image display signals for displaying ultrasound images on the display 104.

Program codes for directing the microprocessor 152 to carry out various signal processing functions are stored in the program memory 154, which may be implemented as a random access memory (RAM) and/or a hard disk drive, or a combination thereof.

The program memory 154 includes a store 180 for storing codes for providing operating system (O/S) functions for the ultrasound system 100.

The program memory 154 also includes an application program memory area 181, generally including codes for causing the ultrasound system 100 to carry out conventional functions associated with operating the ultrasound system 100. The application program memory area 181 includes a store 182 for storing codes for controlling the acquisition of ultrasound signals through the signal acquisition module 110.

The application program memory area 181 also includes a store 184 for storing codes for causing the processor circuit 108 to provide an envelope detection function, a store 186 for storing codes for causing the processor circuit to provide a compression function, and a store 188 for storing codes for causing the processor circuit to provide imageformer functions.

The program memory 154 also includes a memory area 190, generally including codes for causing the ultrasound system 100 to carry out functions in accordance with various aspects of the invention.

The memory area 190 includes a store 192 for storing codes for causing the processor circuit 108 to provide a radio frequency (RF) interface routine, a store 194 for storing codes for causing the processor circuit to provide an envelope interface routine, a store 196 for storing codes for causing the processor circuit to provide a compression interface routine, and a store 198 for storing codes for causing the processor circuit to provide a B-mode interface routine.

The memory area 190 further includes a store 200 for storing codes for causing the processor circuit 108 to provide image enhancement functions, and a store 202 for storing codes for causing the processor circuit to provide conditioning functions.

The variable memory 156 includes a frame input buffer 210 including a plurality of stores for storing input scan frames 230 (shown in FIG. 2), and a frame image buffer 212 for storing processed scan frames.

The variable memory 156 further includes a store 218 for storing a beam angle associated with incident sound waves produced by the transducer 114, and a store 220 for storing an exponent value.

The variable memory 156 may be implemented as a random access memory (RAM) and/or a hard disk drive, or a combination thereof.

Functional Block Diagram

Figure 4:
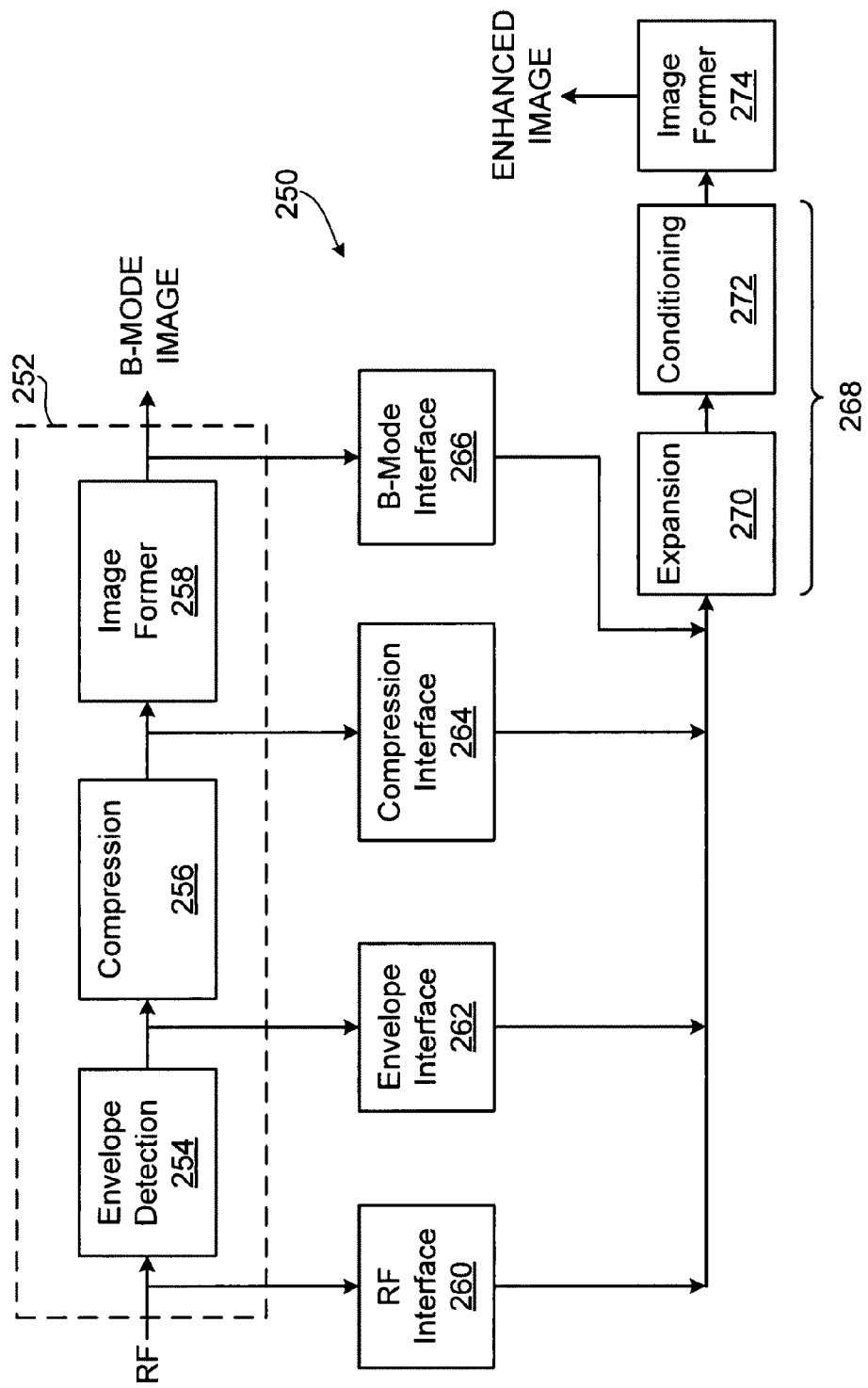
FIG. 4 is a schematic view of a plurality of functional blocks including conventional functional blocks and functional blocks implemented in accordance with embodiments of the invention.

Referring to FIG. 4, functions provided by the program codes stored in the program memory 154 (shown in FIG. 3) are shown as functional blocks at 250. The blocks 250 generally co-operate to cause the processor circuit 108 to provide ultrasound system functions and other functions in accordance with aspects of the invention.

The blocks 250 include a plurality of functional blocks 252 conventionally provided by the ultrasound system 100 shown in FIG. 1. These blocks include envelope detection functions 254, compression functions 256, and imageformer functions 258. In the ultrasound system 100 shown in FIG. 1, the blocks 252 generally cooperate to produce a brightness-mode (B-mode) image at the imageformer 258. In general the envelope detection block 254 receives RF sample values from the signal acquisition module 110 and produces baseband envelope sample values, which are then compressed by the compression block 256 and provided to the imageformer 258, which produces a B-mode image. The B-mode image may then be displayed on the display 104.

The blocks 250 further include blocks according to aspects of the invention, including a radio frequency (RF) interface, an envelope interface 262, a compression interface 264, and a B-mode interface 266, each of which is operable to produce input signal values for processing by a set of image enhancement functional blocks 268.

In general, the RF sample values produced by the signal acquisition module 110 are stored as scan frames in the frame input buffer 210 of the variable memory 156 (shown in FIG. 3). The number of RF sample values in a scan line and the number of scan lines in each scan frame may vary depending on the configuration of the ultrasound system 100. Accordingly when reading the scan frames 230, the number of scan lines/frame and the number of samples/scan line are read from the frame header 232, before separating RF sample values into the scan lines 240. The scan frames 230 are made available to the interface functional blocks 260, 262, 264, and 266 for processing into input signal values for processing in accordance with aspects of the invention.

RF Interface Process

Figure 5:
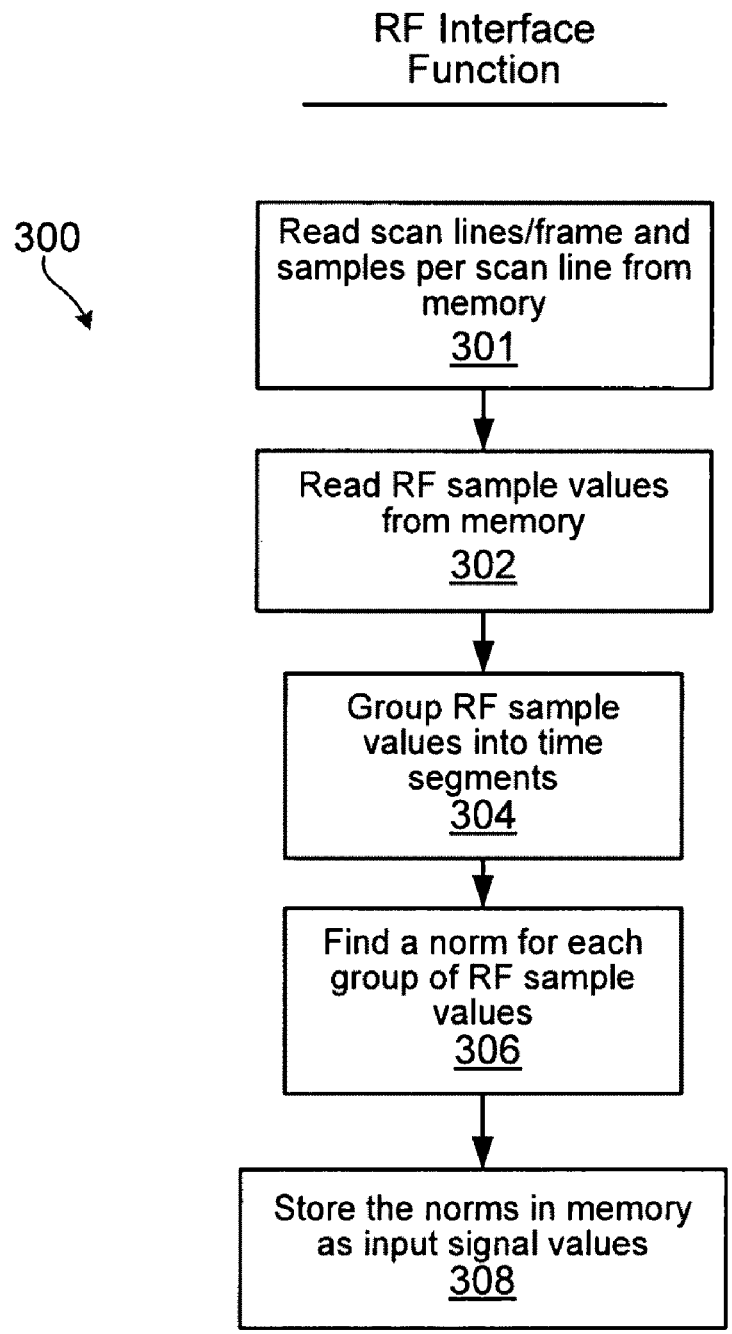
FIG. 5 is a flowchart including blocks of codes for directing the processor circuit shown in FIG. 3 to implement a radio frequency (RF) interface function.

Referring to FIG. 5, a flowchart of blocks of codes for directing the microprocessor 152 (shown in FIG. 3) to provide the RF interface function 260 is shown generally at 300. The actual code to implement each block may be written in any suitable program language, such as C, and/or C++, for example.

The RF interface function begins at block 301 which directs the microprocessor 152 to read the frame header 232 of the scan frame 230 to determine the number of scan lines/frame and the number of samples/scan line in the scan frame data.

Block 302 then directs the microprocessor 152 to read the RF sample values stored by the signal acquisition unit 110 in the frame input buffer 210 in accordance with the values of the scan lines/frame and the samples/scan line read in block 301.

Block 304 then directs the microprocessor 152 to group the RF sample values read from the frame input buffer 210 into groups of RF sample values. Each group of RF sample values includes a plurality of contiguous sample values associated with a respective time segment of the RF sample values. In one embodiment the number of samples in each group and hence the size of the corresponding time segment may be selected in proportion to a size of an object that it is desired to locate in the material. For example, if it is desired to locate a very small object, it may be desirable to use smaller groups representing short time segments.

Block 306 then directs the microprocessor 152 to find a norm for each group of RF samples. In general the norm is a function that assigns a size to the plurality of RF sample values in the group.

The process then continues at block 308, which directs the microprocessor 152 to store the norm sample values in the frame image buffer 212 as input signal values. In embodiments where the groups of RF sample values include more than one RF sample value, the RF sample values are downsampled when computing the norms for the groups of RF sample values, and accordingly the RF interface may provide input sample values having less sample values than the RF sample values received from the signal acquisition module 110.

Time Domain Norm

In one embodiment the norm for each group of RF sample values is computed in the time domain according to the relation:

$$z_i = \left[\sum_{j=1}^{n} |x_j|^p\right]^{\frac{1}{p}} \qquad \text{Eqn 1}$$

where:
- $x_j$ are the RF sample values in the group of RF sample values;
- n is the number of RF samples in the group of RF sample values;
- $z_i$ is the input sample value computed for the $i^{th}$ group of RF sample values; and
- p is a power greater than or equal to one.

In Eqn 1, when p=1 then the norm represents a sum of the absolute values of the RF sample values in the group. When p=2 then the norm generally represents an average power of the group of sample values. When p is very large then a maximum sample value in the group will dominate, and when p=∞ (infinity) then the norm is a maximum sample value in the group.

Advantageously the computed norm for each group of RF sample values provides a single input sample value representing the group. The input sample values are used in further processing in accordance with aspects of the invention.

Frequency Domain Norm

In another embodiment the norm is found by computing a Fourier spectrum of each group of sample values.

Figure 6:
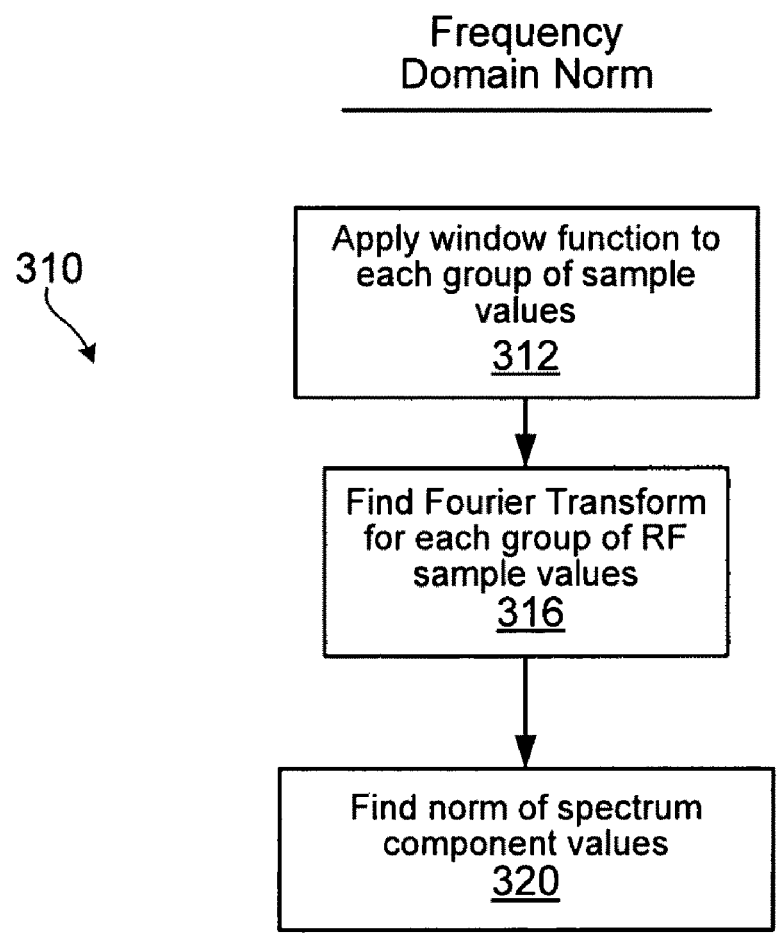
FIG. 6 is a flowchart including blocks of codes for directing the processor circuit shown in FIG. 3 to compute a norm in the frequency domain.

Referring to FIG. 6, a flowchart including blocks of code for directing the microprocessor 152 to compute a norm in the frequency domain for each group of RF sample values is shown generally at 310.

The process begins at block 312, which directs the microprocessor 152 to apply a window function to the RF sample values in each group. The window function operates to reduce spectral leakage caused by samples at the beginning and the end of the group potentially having non-zero values. The window function generally forces values at the beginning and end of the group of sample values to have zero or minimum values, thus preventing generation of leakage frequency components that are not present in the first signals, when applying a subsequent Fourier transform to the discrete time samples.

Commonly used window functions include a Hamming window, a Hanning window, and a Kaiser window for example. Other window functions such as rectangle, triangle, Gaussian, and Blackman windows may alternatively be used. After multiplication by the window function, which has a window length equal to the number of samples in the group, the sample values at the beginning and the end of the group are set to a zero or a minimum value.

Block 316 then directs the microprocessor 152 to find the Fourier spectrum for each group of RF sample values. In one embodiment a fast Fourier transform (FFT) function is used to compute Fourier spectral components of group of sample values.

Block 320 then directs the microprocessor 152 to take a norm of the modulus of the Fourier spectrum to reduce the plurality of frequency component values to a single value for the group, according to the relation:

$$z_i = \left[\sum_{k=1}^{N} |X_k|^p\right]^{\frac{1}{p}} \qquad \text{Eqn 2}$$

where:
$X_k$ are the frequency component values of the Fourier spectrum for the group of RF sample values;
$z_i$ is the input sample value computed for the $i^{th}$ group, of RF sample values;
N is the number frequency component values in the Fourier spectrum for the group of RF sample values; and
p is a power greater than or equal to one.

For example, taking the norm may involve summing the squared modulus of each of a plurality of FFT frequency components.

Alternative Norm Computation

Figure 7:
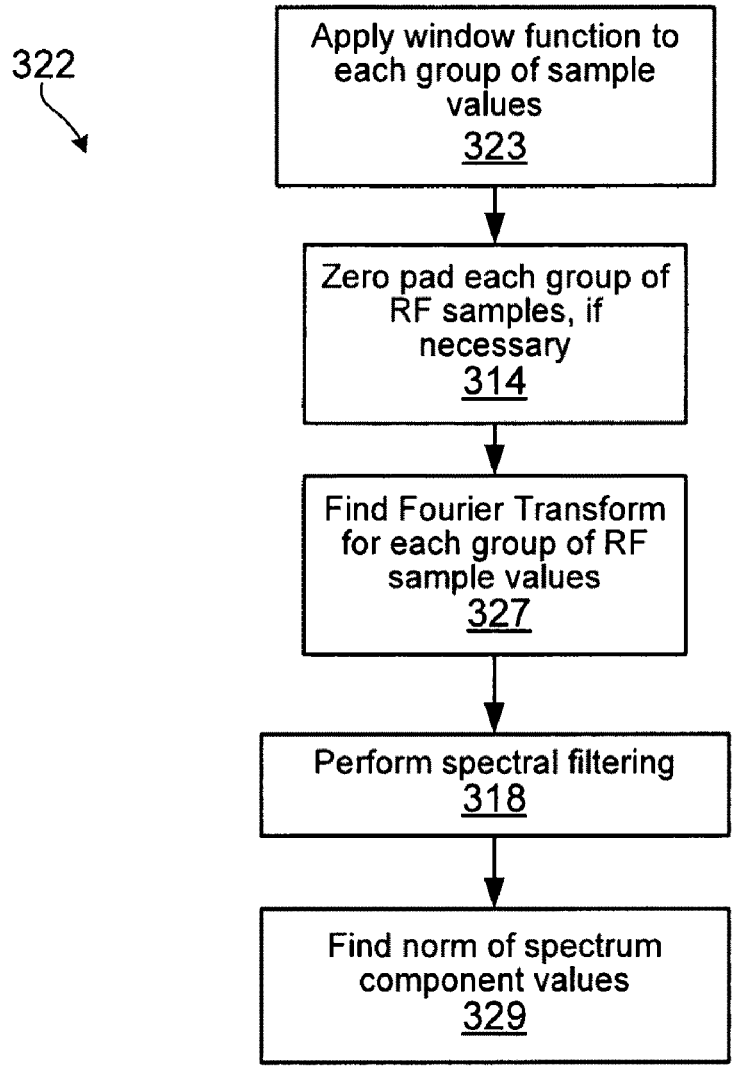
FIG. 7 is a flowchart including blocks of codes for directing the processor circuit shown in FIG. 3 to compute a norm in the frequency domain in accordance with an alternative embodiment of the invention.

Referring to FIG. 7, a flowchart including blocks of code for directing the microprocessor 152 to compute a norm in the frequency domain in accordance with an alternate embodiment is shown generally at 322.

The process begins at block 323 which directs the microprocessor 152 to apply a window function to a group of sample values, as described above.

The process continues at block 314, which directs the microprocessor 152 to perform zero padding of the sample values. In general, zero padding is applied when the number of discrete time samples in the time segment do not correctly match a number of samples required for a particular Fourier transform process (for example the Fourier transform algorithm used may require an even number of time samples, and in this case a zero sample may need to be added to the beginning or end of the time segment if the time segment includes an odd number of samples).

Block 327 then directs the microprocessor 152 to compute a Fourier spectrum of each group of sample values as described above.

The process then continues at block 318, which directs the microprocessor 152 to perform spectral filtering on the Fourier spectrum produced at block 327 to produce a group of frequency samples by selecting a desired range of frequency components to be included in the group of frequency samples.

Block 329 then directs the microprocessor 152 to compute the norm of the group of selected frequency components as described above.

Envelope Interface

As described above in reference to FIGS. 1 and 4, the envelope detection functional block 254 in the ultrasound system 100 provides amplitude envelope sample values generally representing a baseband amplitude envelope of the RF sample values provided by the signal acquisition module 110. The envelope detection function 254 may cause the RF sample values to be down-sampled, such that there are less input sample values than RF sample values, or the number if samples may be preserved when finding the envelope of the RF sample values.

In ultrasound systems that include the envelope detection function represented by block 254, envelope sample values are already available, and may be read from the frame input buffer 210 by the envelope interface 262 and made available as input sample values for receipt by the image enhancement functional blocks 268 without further processing.

Compression Interface

In other embodiments, the envelope sample values provided by the envelope detection function may not be available, or may only be available as compressed envelope sample values provided by the compression function 256, which may logarithmically compress the input sample values.

Figure 8:
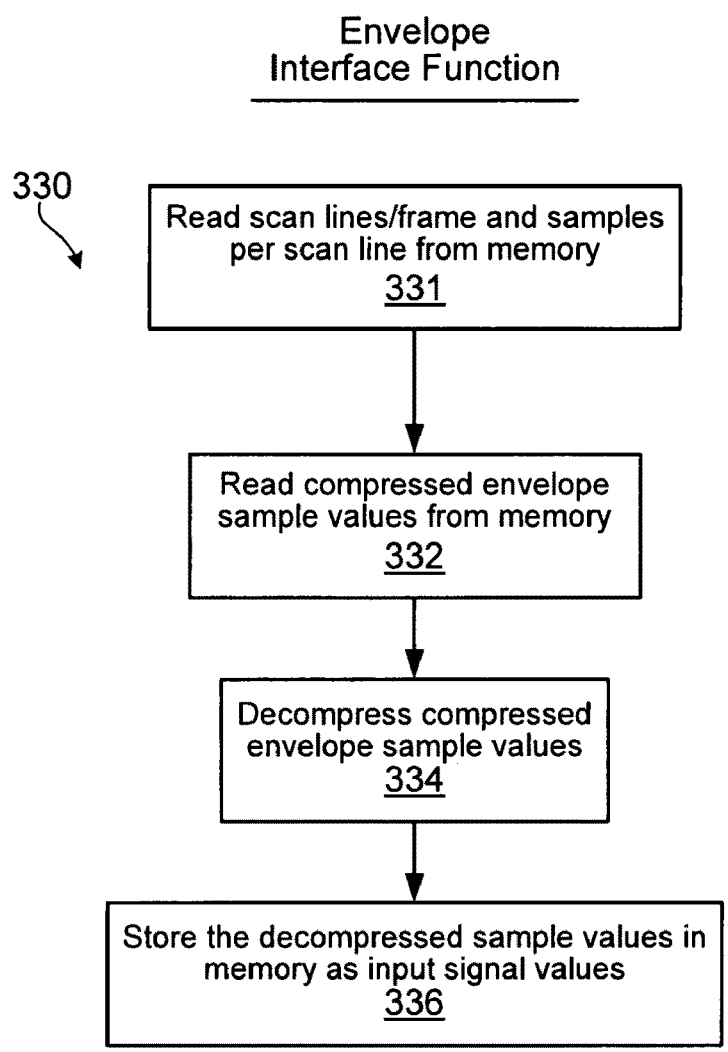
FIG. 8 is a flowchart including blocks of codes for directing the processor circuit shown in FIG. 3 to implement a compression interface function.

Referring to FIG. 8, a flowchart of blocks of codes for directing the microprocessor 152 to provide the compression interface functions 264 is shown generally at 330.

The compression interface function begins at block 331 which directs the microprocessor 152 to read the frame header (232) of the scan frame (230) to determine the number of scan lines/frame and the number of samples/scan line in the scan frame data.

Block 332 then directs the microprocessor 152 to read the compressed envelope values from the frame input buffer (210) in accordance with the values of the scan lines/frame and the samples/scan line read in block 331.

Block 334 then directs the microprocessor 152 to decompress the compressed envelope sample values to produce decompressed envelope sample values.

Where the compression function 256 has logarithmically compressed the envelope sample values provided by the envelope detection function 254 the decompression may be performed by applying the relation:

$$z_i = K e^{\left(\frac{y_i}{D}\right)} \qquad \text{Eqn 3}$$

where:
$z_i$ represents values of the input sample values;
$y_i$ represents the compressed envelope sample values;
D represents a dynamic range parameter;
e is the base of the natural logarithm; and
K is a constant.

The value of the dynamic range parameter D may be estimated in according to the relation:

$$D_e = \frac{2\sqrt{6V}}{\pi} \qquad \text{Eqn 4}$$

where:
$D_e$ represents an estimated value of D; and
V represents a statistical variance of the compressed sample values.

In other embodiments the decompression function may be applied to decompress sample values that have been compressed using other compression functions or algorithms.

The process then continues at block 336, which directs the microprocessor 152 to store the decompressed sample values in the frame input buffer 212 as input signal values.

B-Mode Interface Process

In general, the imageformer function 258 may implement various processing functions on the compressed envelope sample values produced by the compression function 256. For example, in some embodiments the imageformer may perform coordinate transformation to cause images produced using non-rectangular transducer geometries to be displayed correctly on a rectangular display. Other processing such as down-sampling, interpolation and/or scaling of the sample values may be required to produce image data suitable for display on a particular display, for example.

Accordingly, the B-mode image sample values produced by the imageformer 258 generally include compressed envelope sample values that may have been subject to additional processing. In some ultrasound systems, the RF, envelope, and/or compressed sample values may not be made available. In such cases, only B-mode image sample values may be available for further processing.

Figure 9:
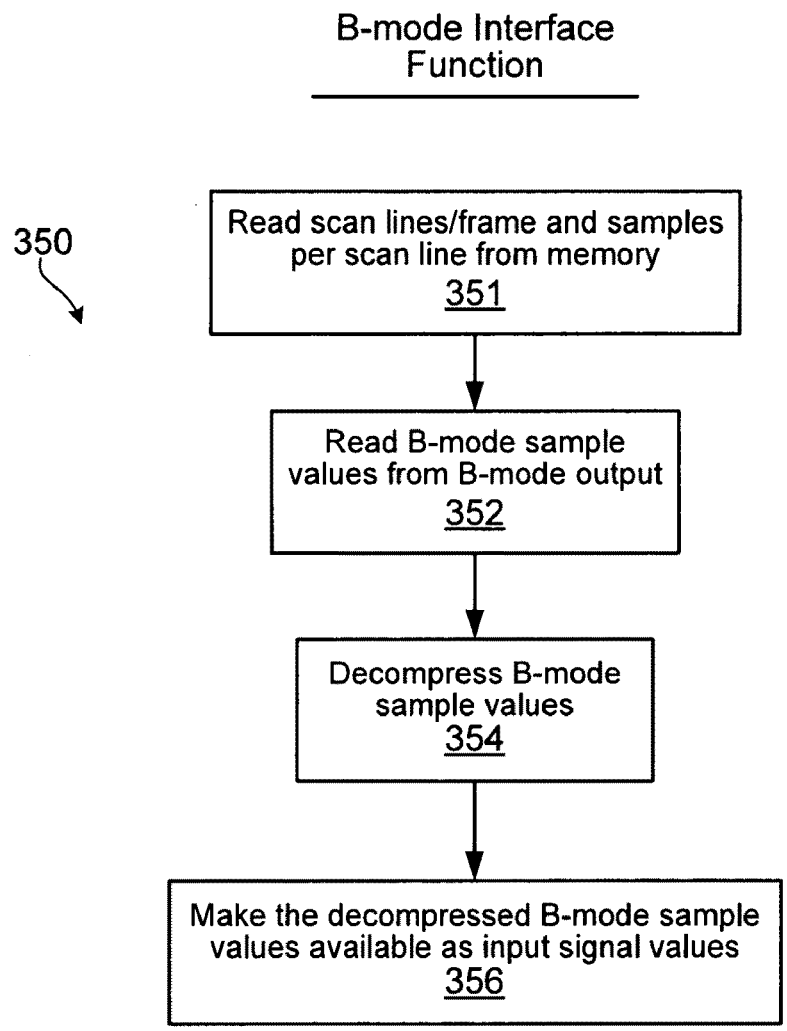
FIG. 9 is a flowchart including blocks of codes for directing the processor circuit shown in FIG. 3 to implement a B-mode interface function.

Referring to FIG. 9, a flowchart of blocks of codes for directing the microprocessor 152 to provide the B-mode interface functions (266) is shown generally at 350.

The B-mode interface function begins at block 351, which directs the microprocessor 152 to read the frame header (232) of the scan frame (230) to determine the number of scan lines/frame and the number of samples/scan line in the scan frame data.

Block 352 then directs the microprocessor 152 to read the B-mode sample values produced by the imageformer function 258 in accordance with the values of the scan lines/frame and the samples/scan line read in block 351. Such values may be available at a display interface output (not shown) for example.

Block 354 then directs the microprocessor 152 to decompress the compressed envelope sample values. In one embodiment the decompression is performed according to Eqn 3 and Eqn 4 above. The decompressed sample values are then made available by the B-mode interface 266 as input sample values.

In general, the RF interface 360, the envelope interface 262, the compression interface 264, and the B-mode interface 266 operate on data in the frame input buffer 210 and store processed input signal value scan frames in the frame image buffer 212.

Image Enhancement

In accordance with one aspect of the invention the image enhancement functional blocks 268 operate on processed input sample values stored in the frame image buffer 212.

The image enhancement blocks 268 include an expansion routine 270 for exponentiating each sample value to produce a plurality of respective exponentiated sample values. The image enhancement blocks 268 also include a conditioning routine 272 for conditioning the exponentiated sample values produced by the expansion routine to produce conditioned exponentiated sample values.

The conditioned exponentiated sample values are then made available to an imageformer functional block 274 to produce an enhanced image representing the ultrasonic reflections. The enhanced image may be displayed on the display 104.

Exponentiation

Figure 10:
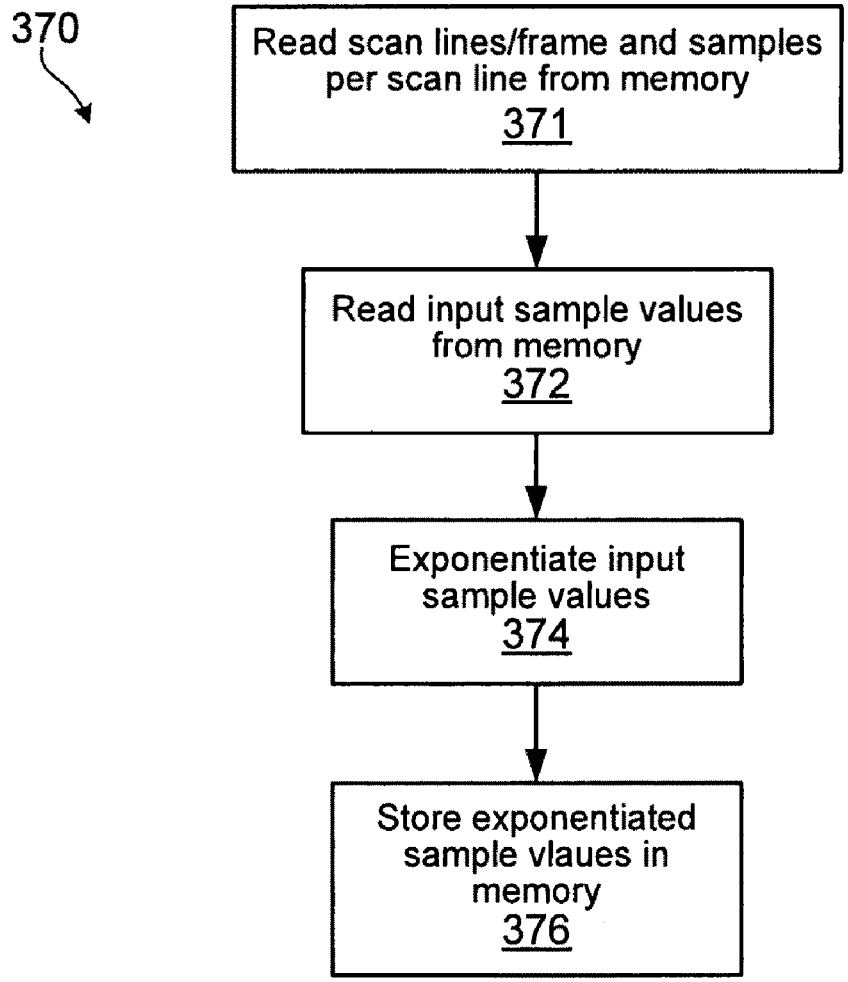
FIG. 10 is a flowchart including blocks of codes for directing the processor circuit shown in FIG. 3 to carry out exponentiation of input signal values.

Referring to FIG. 10, a flowchart of blocks of code for directing the microprocessor 152 to carry out expansion of the input signal values according to block 270 in FIG. 4, is shown generally at 370.

The expansion of the input sample values begins at block 371, which directs the microprocessor 152 to read the frame header (232) of the scan frame (230) to determine the number of scan lines/frame and the number of samples/scan line in the scan frame data.

Block 372, then directs the microprocessor 152 to read the processed input sample values from the frame image buffer 210 in accordance with the values of the scan lines/frame and the samples/scan line read in block 371.

Block 374 then directs the microprocessor 152 to exponentiate each of the input sample values.

In general exponentiation of the input sample values causes sample values of greater magnitude to be expanded or while sample values having smaller magnitude are either expanded to a lesser degree, left unchanged, or compressed. For example in one embodiment the exponentiation is performed in accordance with the relation:

$$Z_i = z_i^p \qquad \text{Eqn 5}$$

where:
  $z_i$ represents values of the input sample values;
  $Z_i$ represents the exponentiated input sample values; and
  p represents a power greater than or equal to one.

For values of p>1, input samples that have a value of less than or equal to 1 are either unaffected by the exponentiation or compressed by the exponentiation. Input samples that have input values greater than 1 will have exponentiated sample values that are proportionally increased. Accordingly, Eqn 5 causes input samples having values less than a minimum value (in this case 1) to be compressed while other samples are expanded, thereby reducing noise in the exponentiated sample values. The exponent p may be set to a fixed exponent value such as 2, or the exponent may be variable and set by an operator of the ultrasound system 100 and stored in the store 220 in the variable memory 156.

Alternatively, in another embodiment the exponentiation may be performed in accordance with the relation:

$$Z_i = e^{\left(\frac{z_i}{k}\right)} \qquad \text{Eqn 6}$$

where:
  $z_i$ represents values of the input sample values;
  $Z_i$ represents the exponentiated input sample values;
  e is the base of the natural logarithm; and
  K is a constant.

The constant K is generally selected to scale the sample values appropriately to obtain exponentiated sample values having a scaling suitable for further processing and/or display.

Alternatively, the exponentiation may be performed using a look-up table that maps input sample values to exponentiated sample values such that input samples having greater values are expanded while input samples having lower values are either compressed or expanded to a lesser degree.

Still referring to FIG. 10, the process then continues at block 376, which directs the microprocessor 152 to store the exponentiated sample values in the frame image buffer 212.

Conditioning

Figure 11:
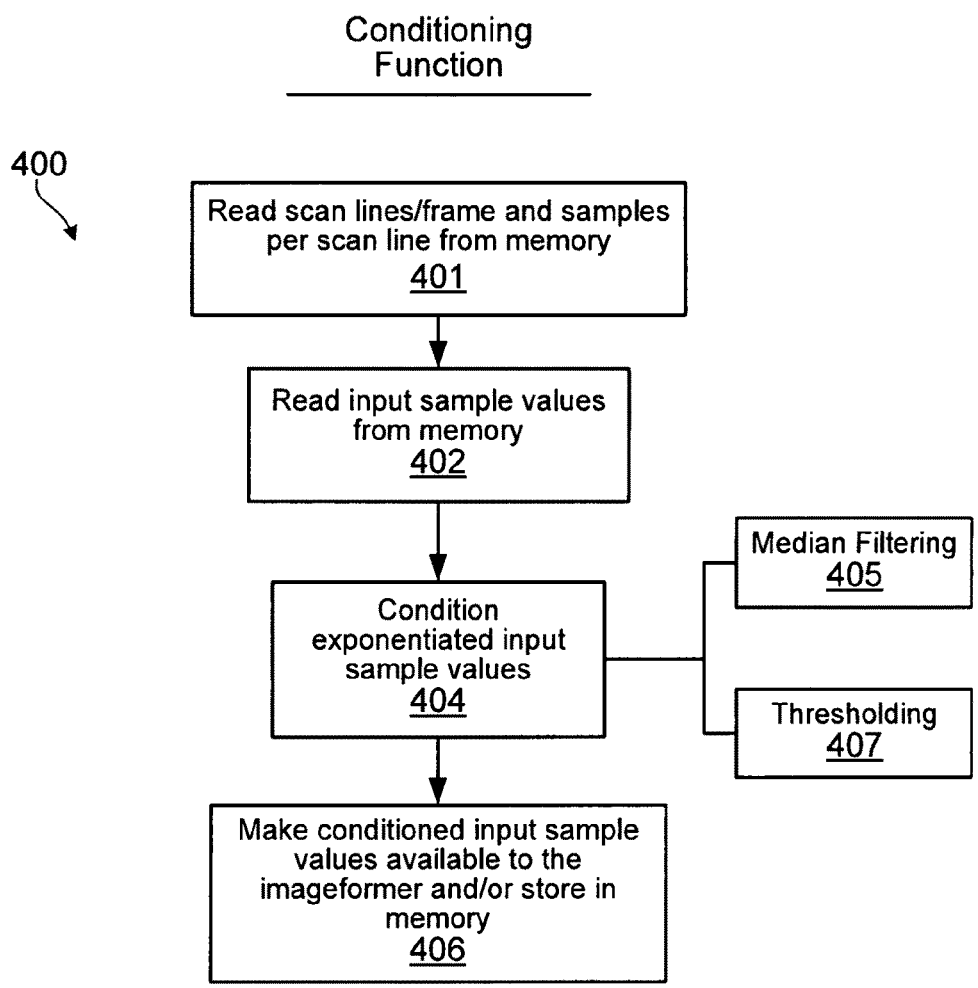
FIG. 11 is a flowchart including blocks of codes for directing the processor circuit shown in FIG. 3 to carry out conditioning of exponentiated input sample values.

Referring to FIG. 11, a flowchart including blocks of code for directing the microprocessor 152 to carry out conditioning of the exponentiated input sample values is shown generally at 400. In general, conditioning may include one or more processing steps such as filtering, thresholding, and/or other processing of the exponentiated sample values to produce conditioned exponentiated sample values that facilitate producing an enhanced image on the display 104 (shown in FIG. 1).

The process begins at block 401, which directs the microprocessor 152 to read the frame header (232) of the scan frame (230) to determine the number of scan lines/frame and the number of samples/scan line in the scan frame data.

Block 402 then directs the microprocessor 152 to read the exponentiated input sample values from the frame image buffer 212 in accordance with the values of the scan lines/frame and the samples/scan line read in block 401.

Block 404 then directs the microprocessor 152 to condition the exponentiated input sample values.

In one embodiment of the invention the conditioning provided by block 404 272 may include median filtering function 405 for filtering the exponentiated sample values, as described below, or a thresholding function 407.

Median Filtering

Figure 12:
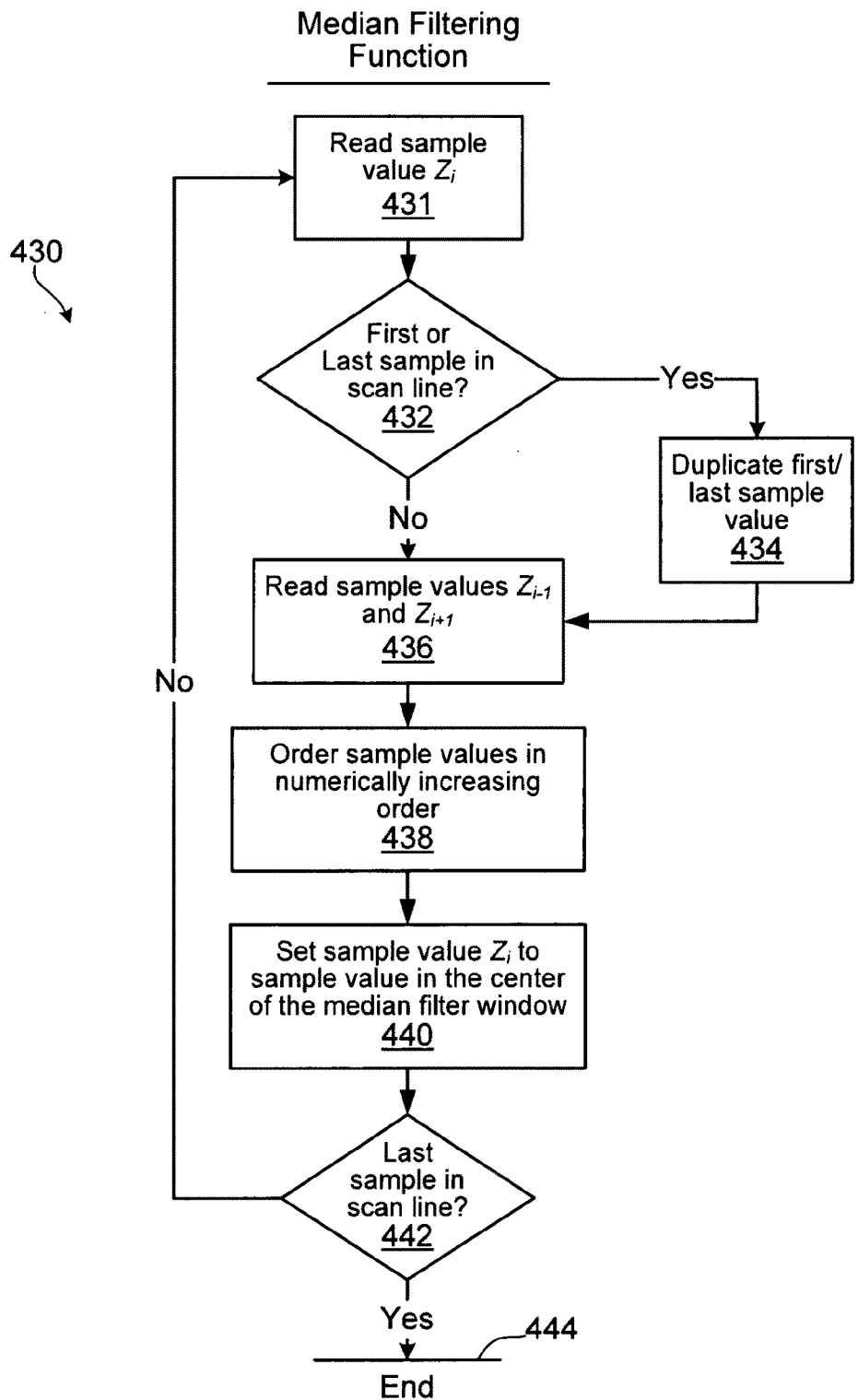
FIG. 12 is a flowchart including blocks of codes for directing the processor circuit shown in FIG. 3 to carry out median filtering of exponentiated input sample values.

Referring to FIG. 12, a flowchart including blocks of code for directing the microprocessor 152 to median filter the exponentiated sample values is shown generally at 430. The flowchart 430 effectively directs the processor to implement a one-dimensional median filter process which is performed individually on each scan line in the scan frame.

The process begins at block 431, which directs the microprocessor 152 to read the $i_{th}$ sample value in the first scan line (in this case the first sample value $Z_1$).

Block 432 then directs the microprocessor 152 to check whether the sample value is either the first or the last sample value in the scan line, in which case the process continues at block 434. Block 434 directs the microprocessor 152 to duplicate the sample value. If the sample is the first sample then the sample value $Z_{i-1}$ is set to the value of the sample $Z_i$. If the sample is the last sample then the sample value $Z_{i+1}$ is set to the value of the sample $Z_i$.

The process then continues at block 436, which directs the microprocessor 152 to read the sample values $Z_{i-1}$ and $Z_{i+1}$. In this embodiment the median filtering involves a window size of three sample values, although in other embodiments the number of samples in the window may be any odd number of samples.

Block 438 then directs the microprocessor 152 to order the sample values $Z_{i-1}$, $Z_i$, and $Z_{i+1}$ in numerically increasing order.

Block 440 then directs the microprocessor 152 to set the sample value $Z_i$ to the sample value in the center of the three sample window.

The process then continues at block 442, which directs the microprocessor 152 to check whether the sample $Z_i$ was the last sample in the scan frame, in which case the process ends as indicated at 444. If the sample $Z_i$ was not the last sample then the process continues at block 431 and blocks 431 to 442 are repeated.

Advantageously, the size of the median filter sample window may be selected in proportion to a size of an object, which it is desired to locate within the material being scanned by the ultrasound system. Accordingly, median filter windows having a larger number of samples may be selected when it is desired to locate larger objects in the material. Note that median filters generally comprise an odd number of samples in the sample window.

In other embodiments a two-dimensional median filtering process may be implemented in place of or in addition to the one-dimensional median filtering process 430. Two dimensional-median filter is a simple extension of the process 430, which in addition to filtering sample values along each scan line, also filters values across multiple scan lines. For example, a two-dimensional median filter window having three samples along the scan line and three samples across three adjacent scan lines may be implemented. The 3×3 filter window is centered on a sample $Z_i$ and sample values are first ordered numerically along the scan line, and then ordered across the scan lines. The sample value Zi is set to the sample value appearing in the center of the 3×3 filter window. When filtering either the first or the last scan line, the respective scan lines are duplicated to facilitate filtering these scan lines that do not have adjacent scan lines on either side.

Advantageously, as in the case of one-dimensional median filtering the size of the filter window may be selected in proportion to a size of an object that it is desired to locate in the material when applying two-dimensional median filtering.

Thresholding

Referring back to FIG. 11, block 404 may further direct the microprocessor 152 to perform the thresholding function 407 on the exponentiated input signal values as an alternative to the median filtering function 405, or in addition to median filtering. Thresholding generally involves setting exponentiated sample values that meet a criterion to a reference value.

In one embodiment exponentiated samples having a value less than a reference threshold value are set to a minimum sample value, such as zero. In other embodiments exponentiated sample values having a value greater than a maximum threshold value are set to the maximum threshold value.

The criterion may thus include meeting either a maximum or a minimum threshold. In one embodiment threshold levels may be set for a scan line, a scan frame or for some portion of the scan line or the scan frame. For example, one-dimensional or two-dimensional maximum filtering may be used to determine a local maximum sample value and the threshold may be set in proportion to local maximum sample value.

Alternatively or additionally, the conditioning in block 404 may include other digital filtering techniques.

Still referring to FIG. 11, after the input sample values are exponentiated, the process continues at block 406, which directs the microprocessor 152 to make the conditioned exponentiated input sample values available to the imageformer function 274. Alternatively or additionally, block 406 may direct the microprocessor 152 to store the conditioned exponentiated input sample values in the frame image buffer 212 for later access or display.

Referring back to FIG. 4, the imageformer function 274 may be conventional and may be provided by the ultrasound system 100. Alternatively, in some embodiments the conditioned exponentiated sample values produced by the conditioning function 272 may be provided to the imageformer 258, where permitted by the configuration of the ultrasound system 100.

In an alternative embodiment, successive scans may be performed at different beam steering angles as described above and the plurality of successive scan frames 230 at different beam steering angles may be provided individually to the image enhancer blocks 268 shown in FIG. 4. After enhancement, the enhanced images corresponding to the plurality of scan frames may then be compounded into a single image for display, as described above.

In other embodiments, the processor circuit 108 shown in FIG. 1 and FIG. 3 may be implemented using parallel microprocessors and/or using field programmable gate array (FPGA) technologies. In practice ultrasound systems are produced using a variety of different architectures and some of the embodiments described herein may be more conveniently implemented depending on the hardware configuration of the ultrasound system.

Furthermore the various functions described with reference to FIG. 3 and FIG. 4 may combined or performed in different sequence to achieve the same result. For example, at block 320 in FIG. 6, when taking the modulus of the frequency components, one may perform exponentiation at the same time by squaring each frequency component value before summing thus performing exponentiation in combination with finding the norm of the RF sample values.

Advantageously, the enhancement functional blocks 268 operate on input samples received from one of the interface functions 260, 262, 264, or 266 shown in FIG. 4, to produce enhanced images of objects within the material being inspected by the ultrasound system. In the enhanced images, expansion of input sample values emphasizes large sample values over smaller sample values. In generally the smaller sample values may represent noise or reflections from other scatterers within the material. The enhanced images thus provide improved image contrast, particularly when viewing objects that are good reflectors of incident ultrasonic waves.

While specific embodiments of the invention have been described and illustrated, such embodiments should be considered illustrative of the invention only and not as limiting the invention as construed in accordance with the accompanying claims.

What is claimed is:

1. A method for processing ultrasonic image signals for imaging a small strong reflector object within a material, the method comprising:
   receiving a plurality of radio frequency (RF) input sample values representing reflected sound waves in a ultrasonic system;
   grouping said RF sample values into groups of RF sample values comprising a plurality of contiguous sample values associated with a respective time segment of said RF sample values, each group having a number of samples selected in proportion to a size of the reflector object;
   computing a norm value for each group of RF sample values to produce a plurality of respective norm values;
   expanding said norm values by raising each norm value to a power greater than one to produce a plurality of respective expanded norm values;
   thresholding said expanded norm values to produce a plurality of thresholded values for receipt by an imageformer; and
   causing said imageformer to produce an image representing said ultrasonic sound waves in response to said thresholded values.

2. The method of claim 1 wherein receiving said plurality of RF input sample values comprises receiving a plurality of input RF sample values produced by compounding RF sample values representing reflected sound waves produced by incident ultrasonic sound waves having at least one of differing focal characteristics and differing beam steering angles.

3. The method of claim 2 wherein contiguous groups of a pre-defined number of RF input sample values are associated with scan lines and wherein said scan lines define a scan frame representing a spatial ultrasound scan of a material, and further comprising:
   receiving a plurality of scan frames representing successive ultrasonic scans of said material produced by incident ultrasonic sound waves having at least one of differing focal characteristics and differing beam steering angles; and
   wherein causing said imageformer to produce said image further comprises compounding thresholded values in said plurality of scan frames before causing said imageformer to produce said image.

4. The method of claim 1 wherein said thresholding comprises at least one of:
   setting expanded samples having a value less than a reference threshold value to a minimum sample value; and
   setting expanded sample values having a value greater than a maximum threshold value to said maximum threshold value.

5. The method of claim 1 further comprising producing said plurality of RF input sample values.

6. The method of claim 5 wherein producing said plurality of RF input sample values comprises:
   receiving a plurality of compressed envelope sample values, said compressed envelope sample values representing a compressed amplitude envelope of a radio frequency (RF) signal, said RF signal representing the reflected sound waves; and
   decompressing said compressed envelope sample values to produce said RF input sample values.

7. The method of claim 6 wherein receiving said plurality of compressed envelope sample values comprises receiving logarithmically compressed sample values.

8. The method of claim 7 wherein said decompressing comprises computing said RF input sample values according to the relation:

$$x_i = Ke^{\left(\frac{y_i}{D}\right)},$$

where:
   $x_i$ represents values of said RF input sample values;
   $y_i$ represents said compressed envelope sample values;
   D represents a dynamic range parameter;
   e is the base of the natural logarithm; and
   K is a constant.

9. The method of claim 5 wherein said imageformer is a first imageformer and wherein producing said plurality of RF input sample values comprises:
   receiving a plurality of brightness-mode (B-mode) sample values, said B-mode sample values being generated by a second imageformer associated with the ultrasound system; and
   decompressing said B-mode sample values to produce said RF input sample values.

10. The method of claim 9 wherein receiving said plurality of B-mode sample values comprises receiving logarithmically compressed B-mode sample values.

11. The method of claim 10 wherein said decompressing comprises computing said RF input sample values according to the relation:

$$x_i = Ke^{\left(\frac{y_i}{D}\right)},$$

where:
   $x_i$ represents said RF input sample values;
   $y_i$ represents said B-mode sample values;
   D represents a dynamic range parameter;
   e is the base of the natural logarithm; and
   K is a constant.

12. The method of claim 1 wherein computing said norm comprises computing a norm for each group of RF sample values according to the relation:

$$z_i = \left[\sum_{j=1}^{n} |x_j|^p\right]^{\frac{1}{p}}$$

where:
   $x_j$ are the RF sample values in said group of RF sample values;
   $z_i$ is the input sample value computed for the $i^{th}$ group of RF sample values; and
   p is a power greater than or equal to one.

13. The method of claim 1 further comprising applying a window function to said RF sample values in each group of RF sample values.

14. The method of claim 13 wherein finding said norm comprises for each group of RF sample values:
   computing a discrete Fourier transform for each group of RF sample values to produce a plurality of frequency component values associated with each said group of RF sample values; and
   computing a norm of said plurality of frequency component values associated with each said group of RF samples.

15. The method of claim 14 wherein computing said norm comprises computing a norm according to the relation:

$$z_i = \left[\sum_{k=1}^{N} |X_k|^p\right]^{\frac{1}{p}}$$

where:
   $X_k$ are the frequency component values of the Fourier spectrum for the group of RF sample values;
   $z_i$ is the input sample value computed for the $i^{th}$ group of RF sample values;
   N is the number frequency component values in the Fourier spectrum for the group of RF sample values; and
   p is a power greater than or equal to one.

16. The method of claim 14 wherein computing said discrete Fourier transform comprises computing a fast Fourier transform (FFT) for each group of RF sample values.

17. An apparatus for processing ultrasonic image signals for imaging a small strong reflector object within a material, the apparatus comprising:
   a receiver for receiving a plurality of radio frequency (RF) input sample values representing reflected sound waves in a ultrasonic system, said receiver being operably configured to group said RF sample values into groups of RF sample values comprising a plurality of contiguous sample values associated with a respective time segment of said RF sample values, each group having a number of samples selected in proportion to a size of the reflector object;
   compute a norm value for each group of RF sample values to produce a plurality of respective norm values;
   an image enhancer operably configured to:
      expand said norm values by raising each norm value to a power greater than one to produce a plurality of respective expanded norm values;
      threshold said expanded norm values to produce a plurality of thresholded values for receipt by an imageformer; and
   an imageformer operably configured to produce an image representing said ultrasonic sound waves in response to said thresholded values.

18. A non-transitory computer readable medium encoded with codes for directing a processor circuit to carry out a method for processing ultrasonic image signals for imaging a small strong reflector object within a material, the method comprising:
   receiving a plurality of radio frequency (RF) input sample values representing reflected sound waves in a ultrasonic system;
   grouping said RF sample values into groups of RF sample values comprising a plurality of contiguous sample values associated with a respective time segment of said RF sample values, each group having a number of samples selected in proportion to a size of the reflector object;
   computing a norm value for each group of RF sample values to produce a plurality of respective norm values;
   expanding said norm values by raising each norm value to a power greater than one to produce a plurality of respective expanded norm values;
   thresholding said expanded norm values to produce a plurality of thresholded values for receipt by an imageformer; and
   causing said imageformer to produce an image representing said ultrasonic sound waves in response to said thresholded values.

* * * * *